United States Patent
Go et al.

(10) Patent No.: US 12,075,455 B2
(45) Date of Patent: Aug. 27, 2024

(54) METHOD FOR TRANSMITTING AND RECEIVING SOUNDING REFERENCE SIGNAL IN WIRELESS COMMUNICATION SYSTEM, AND APPARATUS THEREFOR

(71) Applicant: LG ELECTRONICS INC., Seoul (KR)

(72) Inventors: Seongwon Go, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 17/598,674

(22) PCT Filed: Mar. 30, 2020

(86) PCT No.: PCT/KR2020/004332
§ 371 (c)(1),
(2) Date: Sep. 27, 2021

(87) PCT Pub. No.: WO2020/197353
PCT Pub. Date: Oct. 1, 2020

(65) Prior Publication Data
US 2022/0201696 A1 Jun. 23, 2022

Related U.S. Application Data

(60) Provisional application No. 62/825,750, filed on Mar. 28, 2019.

(51) Int. Cl.
*H04W 72/542* (2023.01)
*H04B 7/0404* (2017.01)
(Continued)

(52) U.S. Cl.
CPC ......... *H04W 72/542* (2023.01); *H04L 5/0051* (2013.01); *H04W 72/0446* (2013.01); *H04W 72/23* (2023.01); *H04W 72/51* (2023.01)

(58) Field of Classification Search
CPC ........... H04W 72/542; H04W 72/0446; H04W 72/23; H04W 72/51; H04L 5/0051;
(Continued)

(56) References Cited

U.S. PATENT DOCUMENTS

| | | | |
|---|---|---|---|
| 2018/0227094 A1* | 8/2018 | Liu | H04B 7/06966 |
| 2019/0297603 A1* | 9/2019 | Guo | H04B 7/0695 |
| 2021/0360649 A1* | 11/2021 | Athley | H04W 72/542 |

FOREIGN PATENT DOCUMENTS

KR 1020190028796 3/2019

OTHER PUBLICATIONS

Physical layer procedures for data (Release 15) 3GPP TS 38.214 V15.5.0 (Mar. 2019). (Year: 2019).*

(Continued)

*Primary Examiner* — Inder P Mehra
(74) *Attorney, Agent, or Firm* — BRYAN CAVE LEIGHTON PAISNER LLP

(57) ABSTRACT

A method for transmitting, by a terminal, a sounding reference signal (SRS) in a wireless communication system, according to one embodiment of the present specification, comprises the steps of: transmitting UE capability information related to a sounding reference signal (SRS) for downlink channel state information acquisition (DL CSI acquisition); receiving configuration information related to transmission of the SRS; and transmitting the SRS.

9 Claims, 17 Drawing Sheets

(51) Int. Cl.
*H04B 7/06* (2006.01)
*H04L 1/00* (2006.01)
*H04L 5/00* (2006.01)
*H04W 72/0446* (2023.01)
*H04W 72/23* (2023.01)
*H04W 72/51* (2023.01)

(58) Field of Classification Search
CPC ....... H04L 1/00; H04L 5/0094; H04B 7/0404; H04B 7/06
USPC .......................................................... 370/329
See application file for complete search history.

(56) References Cited

OTHER PUBLICATIONS

3GPP, TSG RAN, NR, Physical layer procedures for data (Release 15), 3GPP TS 38.214 V15.5.0, Mar. 27, 2019, see sections 6.2.1-6.2.1.2.
CATT, Enhancements on multi-beam operation, R1-1902020, 3GPP TSG RAN WG1 Meeting #96, Athens, Greece, Feb. 16, 2019, see sections 2-3.
LG Electronics, Discussion on multi-beam based operations and enhancements, R1-1902092, 3GPP TSG RAN WG1 Meeting #96, Athens, Greece, Feb. 16, 2019, see sections 2-7.

* cited by examiner

[FIG. 1]
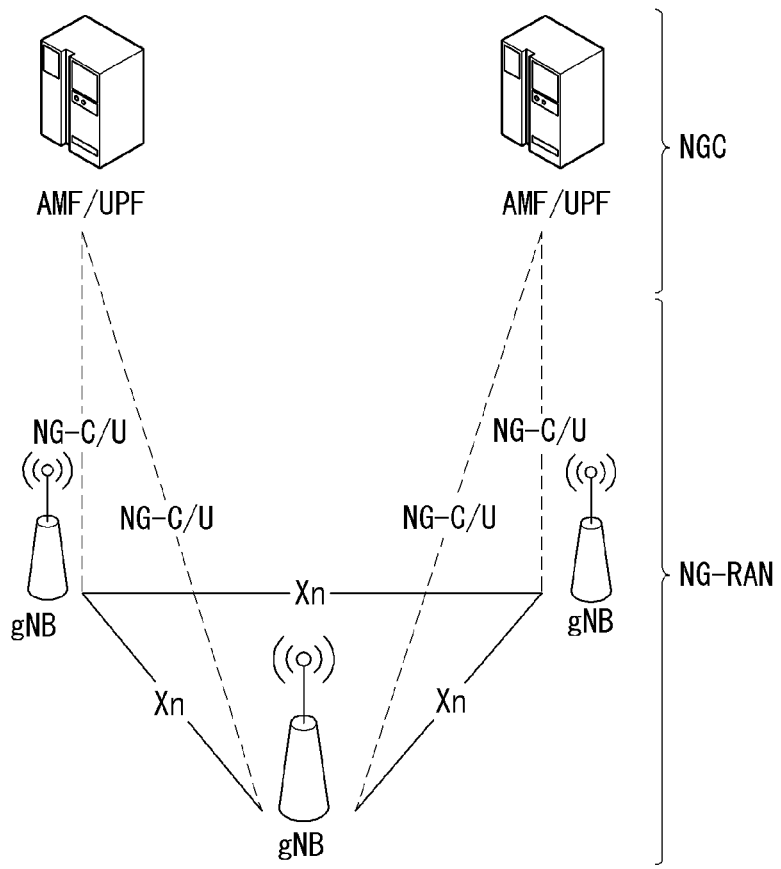
[FIG. 2]
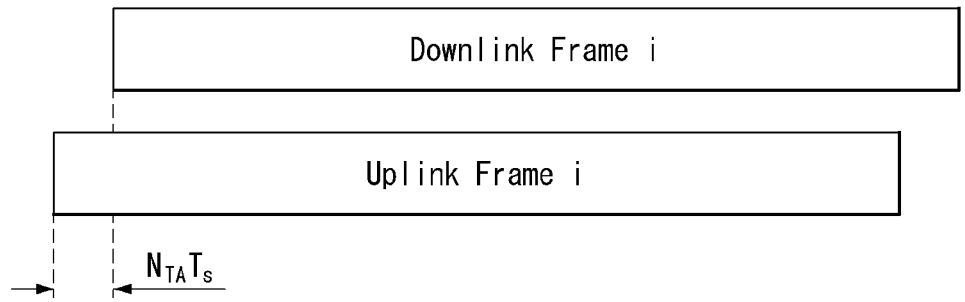

[FIG. 3]
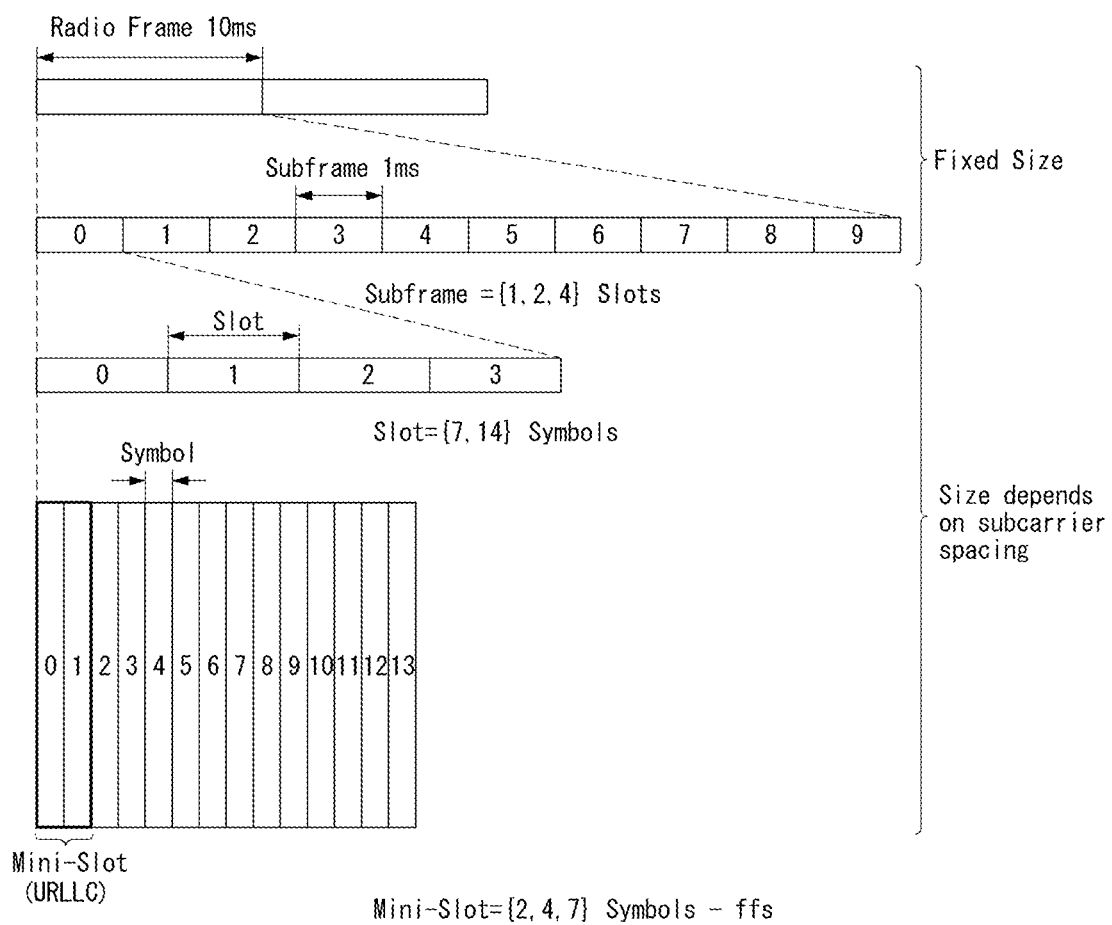

[FIG. 4]
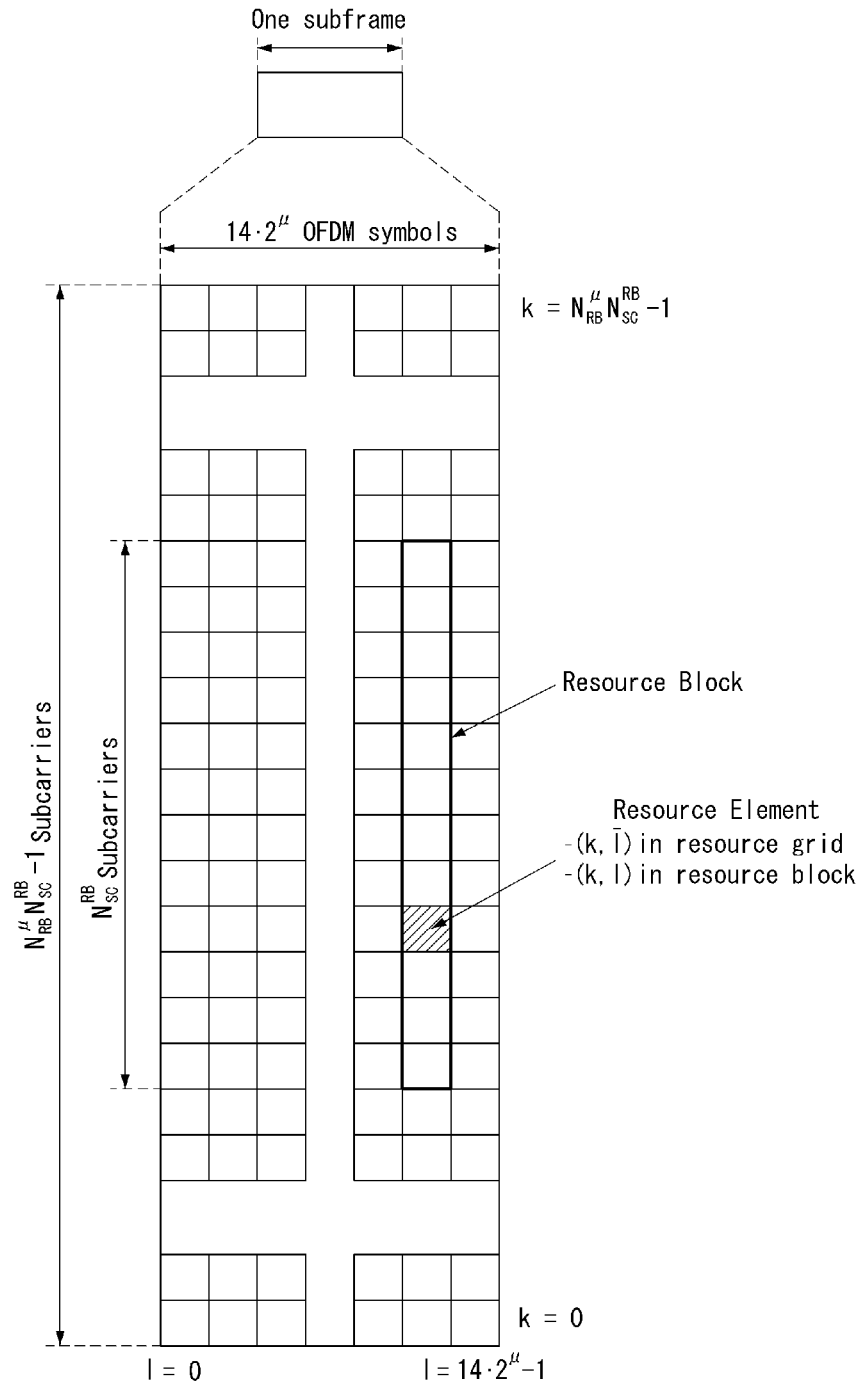

[FIG. 5]
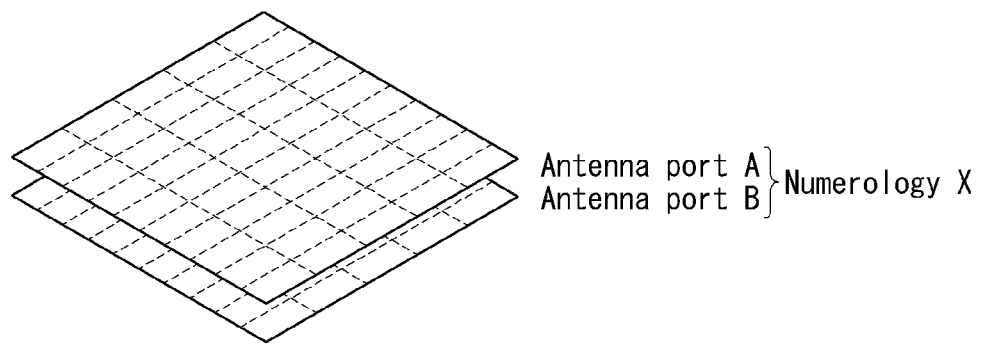
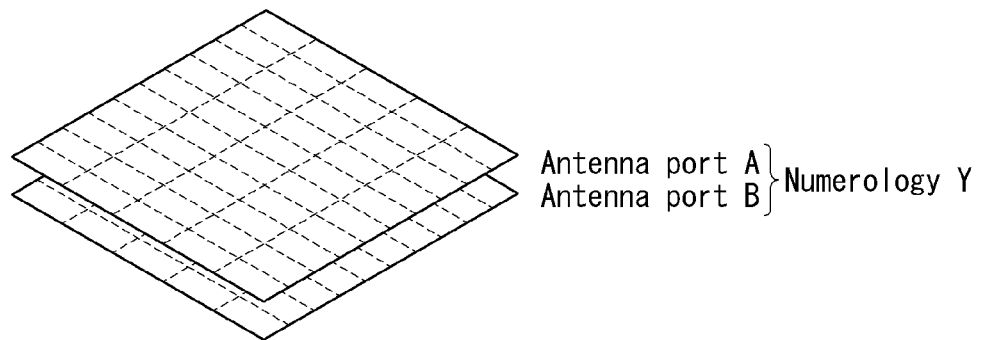

[FIG. 6]
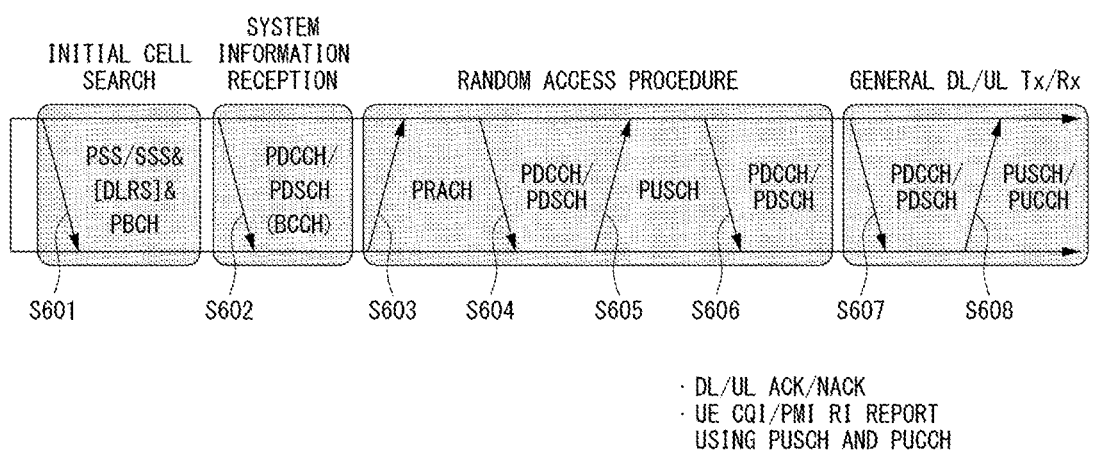

[FIG. 7]
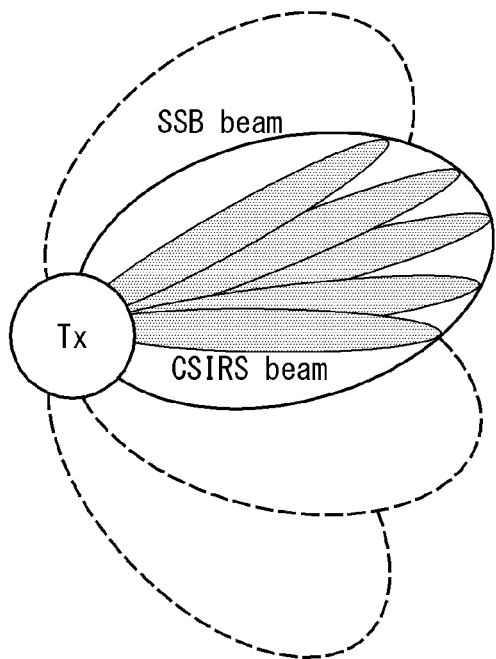
[FIG. 8]
Base station Rx beam sweeping
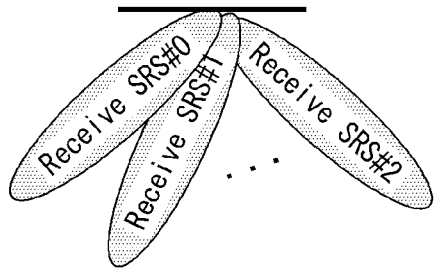
Base station beam being fixed
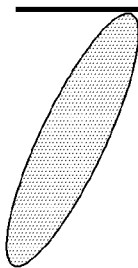
UE TX beam (being fixed)
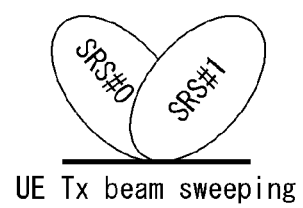
UE Tx beam sweeping
(a)                      (b)

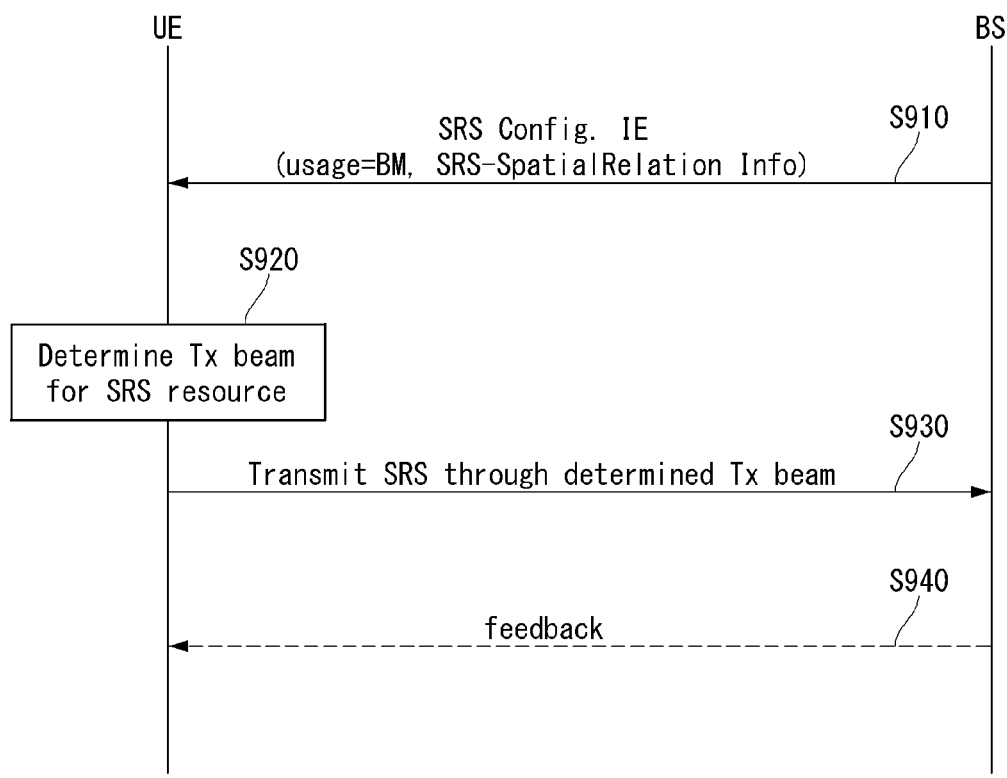
[FIG. 9]

[FIG. 10]
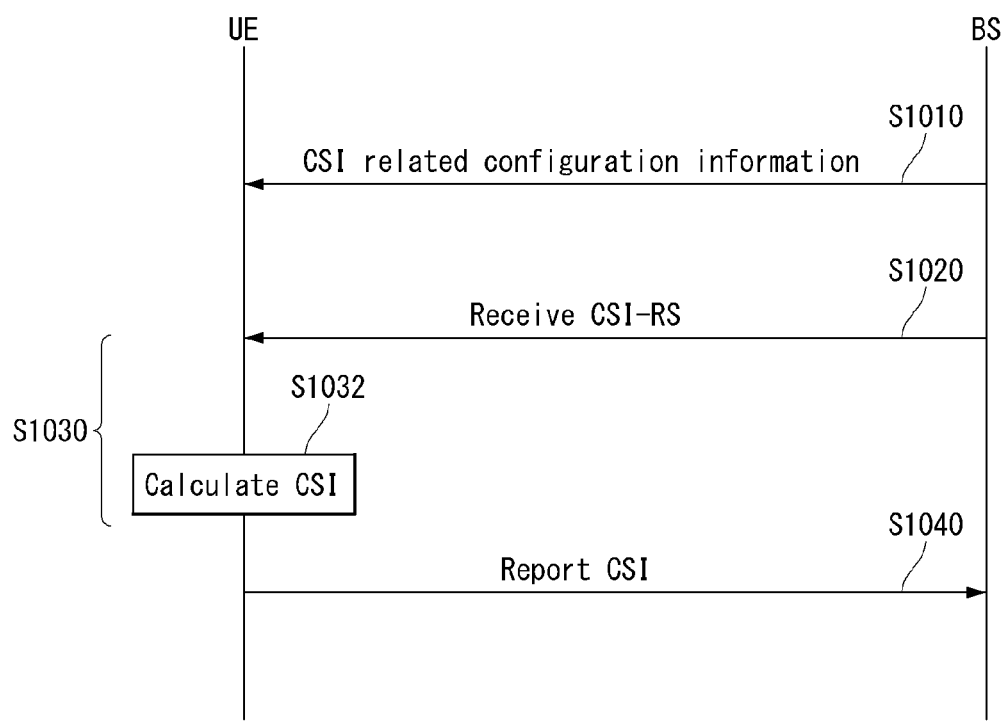

[FIG. 11]
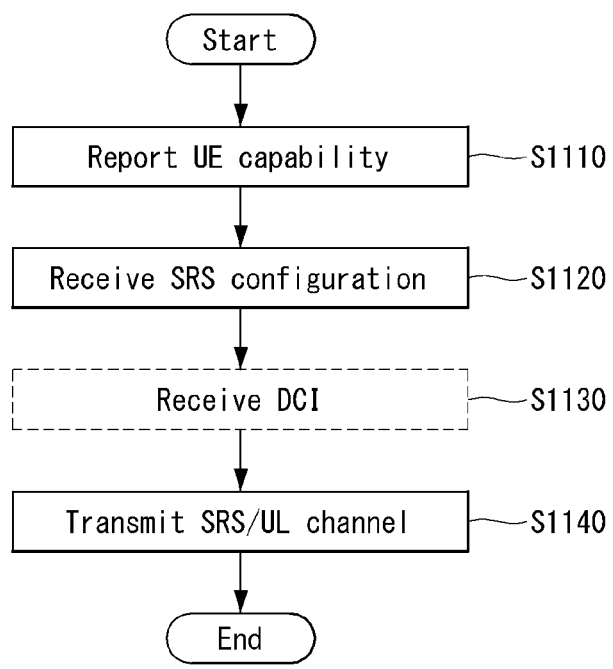

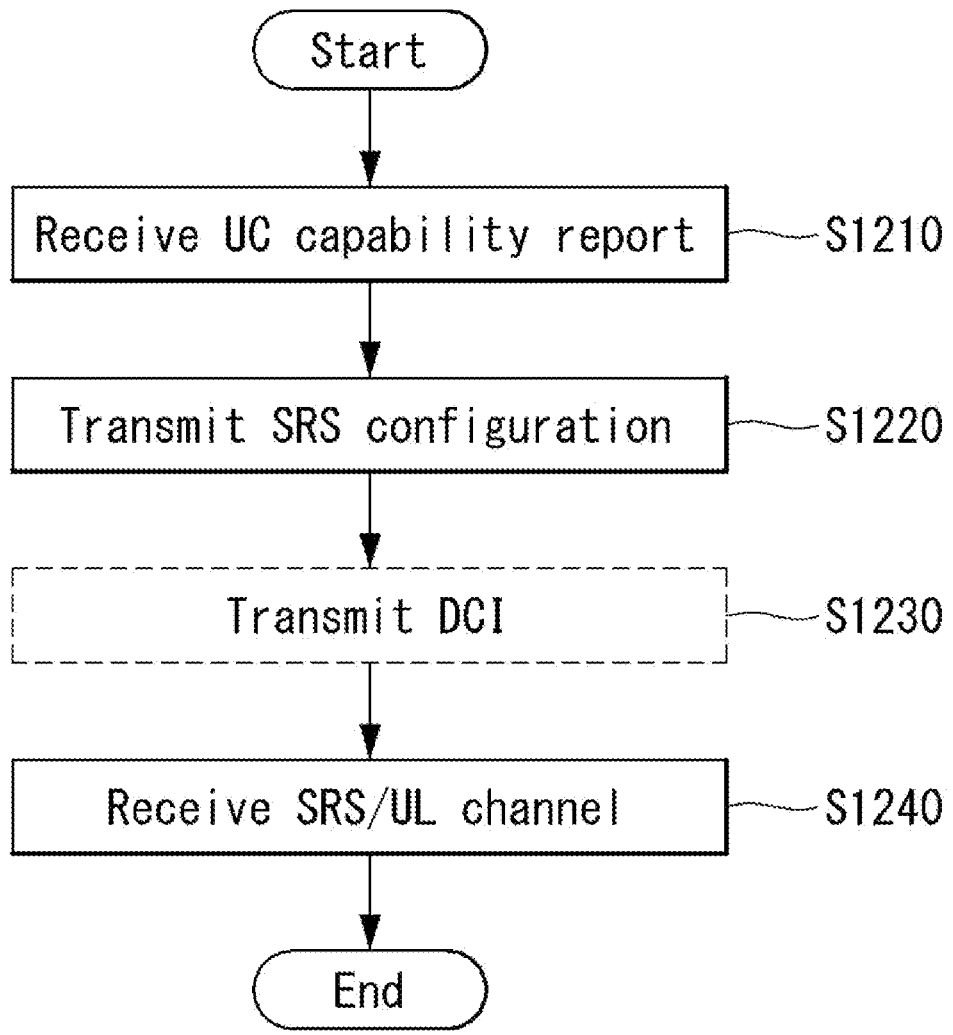
[FIG. 12]

[FIG. 13]
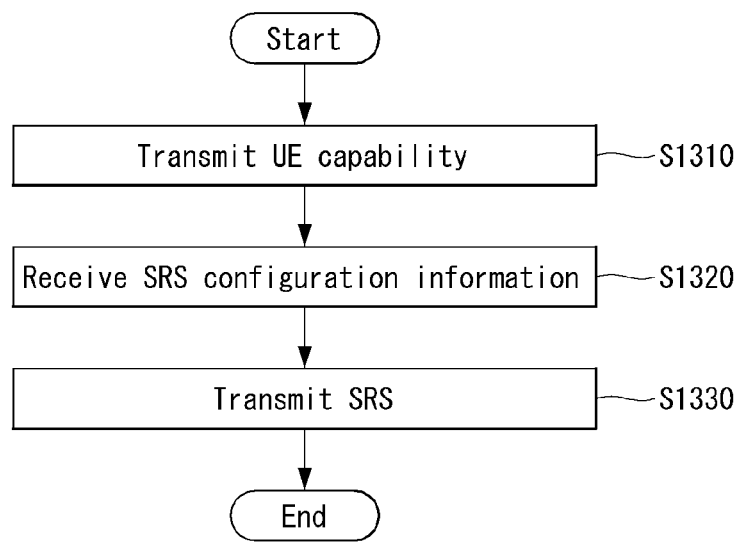

[FIG. 14]
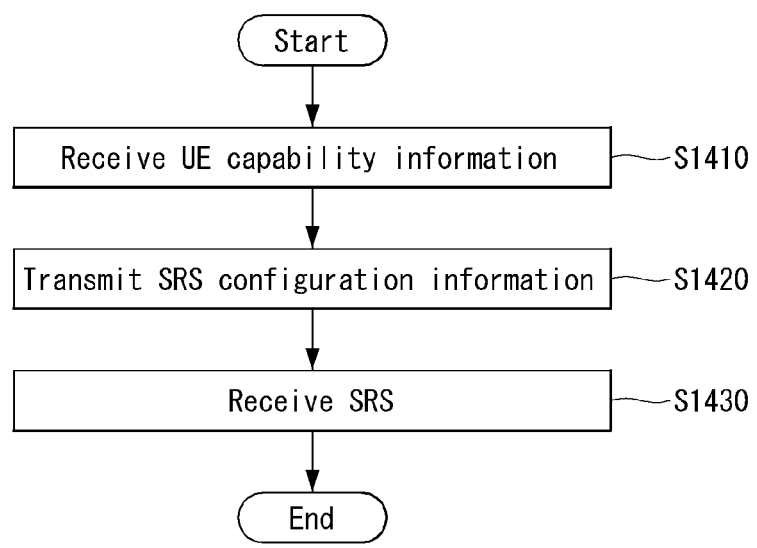

[FIG. 15]
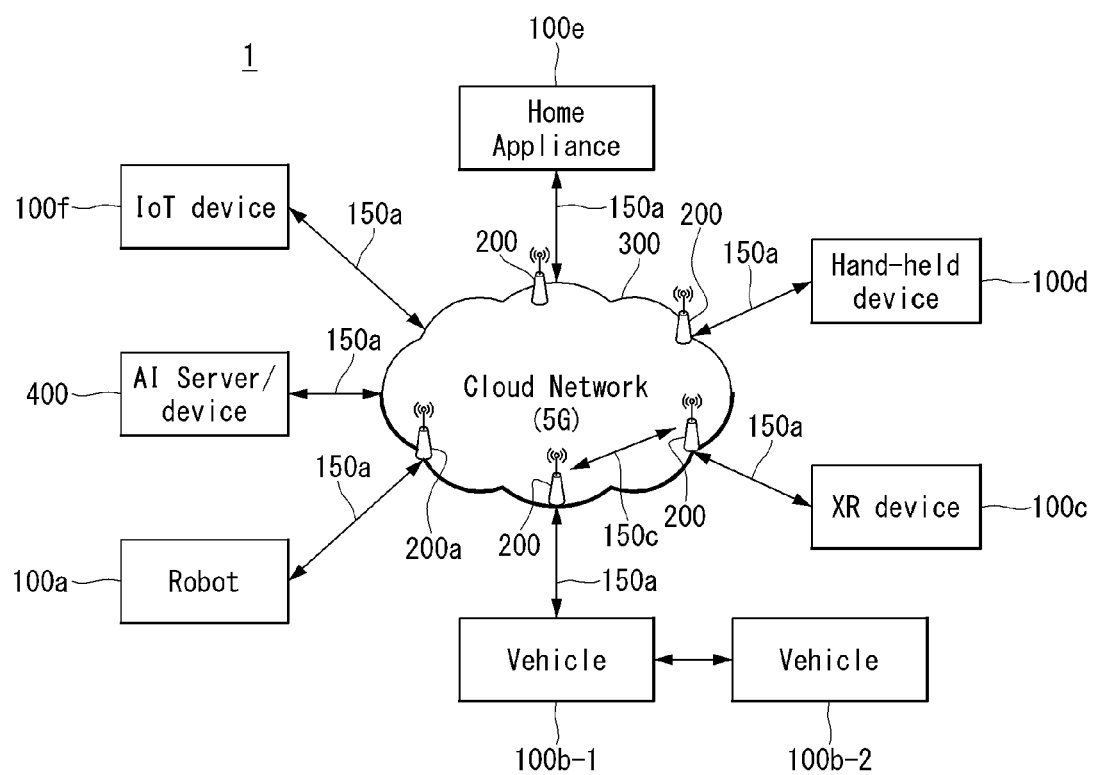

[FIG. 16]
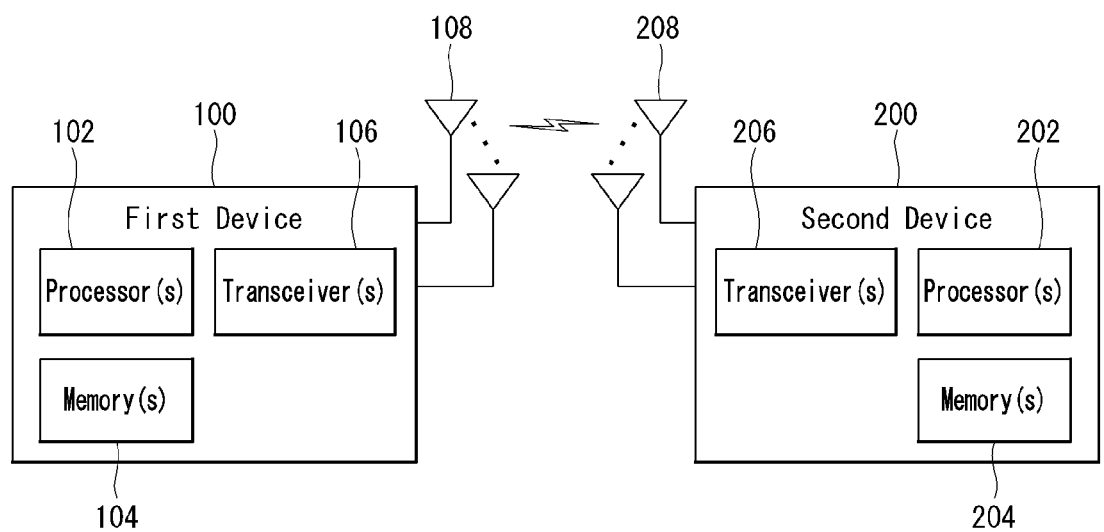

[FIG. 17]
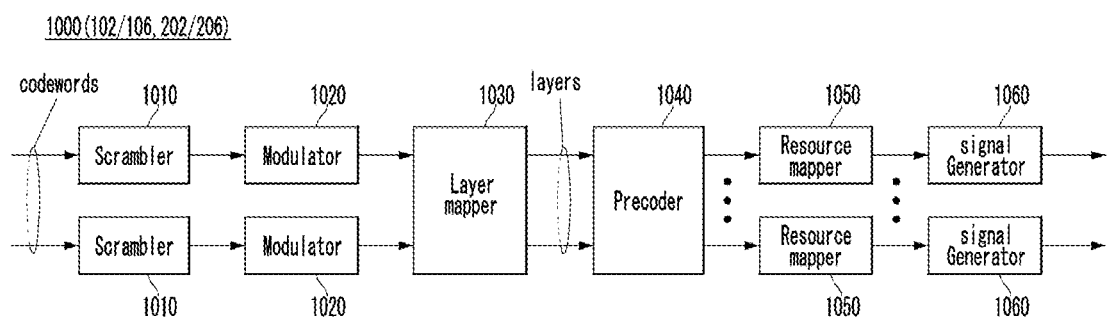

[FIG. 18]
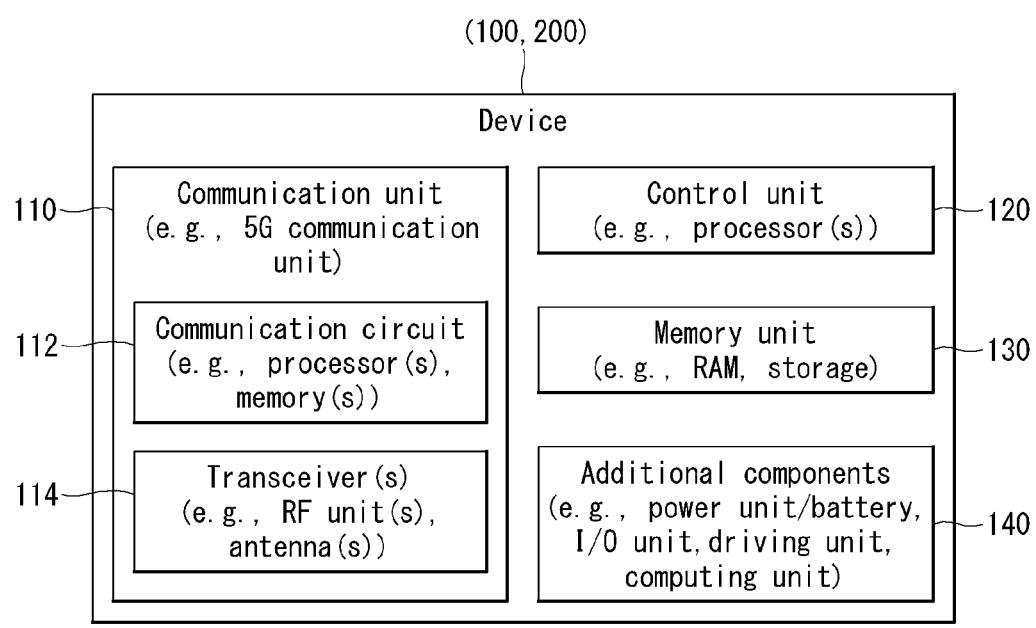

[FIG. 19]
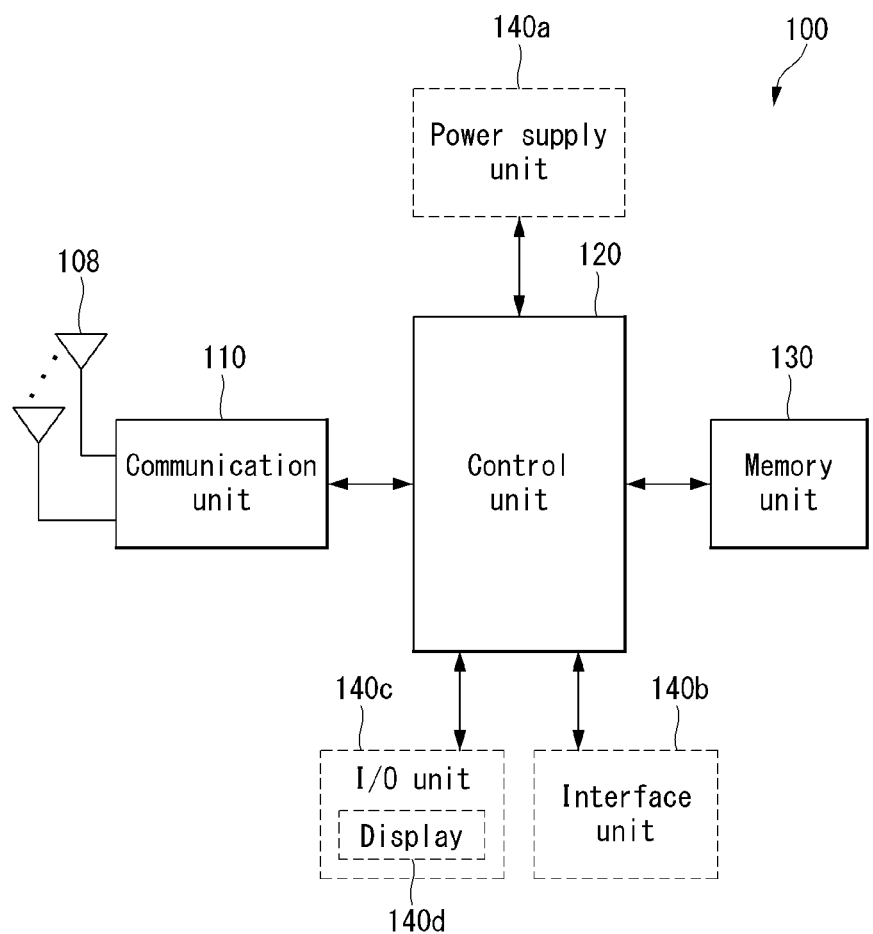

METHOD FOR TRANSMITTING AND RECEIVING SOUNDING REFERENCE SIGNAL IN WIRELESS COMMUNICATION SYSTEM, AND APPARATUS THEREFOR

This application is the National Stage filing under 35 U.S.C. 371 of International Application No. PCT/KR2020/004332 filed on Mar. 30, 2020, which claims priority to U.S. Provisional Application No. 62/825,750 filed on Mar. 28, 2019, the contents of which are all hereby incorporated by reference herein in their entirety.

TECHNICAL FIELD

The present disclosure relates to a method for transmitting and receiving a sounding reference signal in a wireless communication system, and an apparatus therefor.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method for transmitting a sounding reference signal (SRS) by a multi-panel UE. In particular, the present disclosure proposes a method for transmitting the SRS a UE capable of simultaneous transmission through multi-panels.

The technical objects of the present disclosure are not limited to the aforementioned technical objects, and other technical objects, which are not mentioned above, will be apparently appreciated by a person having ordinary skill in the art from the following description.

Technical Solution

A method for transmitting, by a terminal, a sounding reference signal (SRS) in a wireless communication system, according to one embodiment of the present specification, comprises the steps of: transmitting UE capability information related to a sounding reference signal (SRS) for downlink channel state information acquisition (DL CSI acquisition); receiving configuration information related to transmission of the SRS; and transmitting the SRS.

The UE capability information is related to a plurality of panels, at least one SRS resource set is configured for each panel among the plurality of panels based on the UE capability information, and the SRS is transmitted based on at least one of the plurality of panels.

The SRS resource set may include at least one SRS resource.

The UE capability information may include information on at least one of the number of plurality of panels, the number of antennas for each panel, whether the SRS resource sets of each panel are simultaneously transmittable, or a panel switching delay.

The number of plurality of panels may include at least one of the number of transmission (Tx) panels or the number of reception (Rx) panels.

The configuration information may include information on at least one of a plurality of SRS resource sets for the plurality of panels, at least one SRS resource which belongs to each SRS resource set among the plurality of sets, or candidate locations of the SRS resource.

Based on that the UE capability information includes information representing simultaneous transmission of the SRS resource sets of the respective panels, SRS resource sets for different panels may be configured in the same slot, and at least one SRS resource which belongs to the SRS resource sets for the different panels is configured in the same symbol.

The SRS may be transmitted in at least one symbol based on a specific location among the candidate locations of the SRS resource.

The method may further include receiving a message including information representing the specific location.

The message may be based on a Medium Access Control-Control Element (MAC-CE) or Downlink Control Information (DCI).

According to another embodiment of the present disclosure, a UE for transmitting a sounding reference signal (SRS) in a wireless communication system includes: one or more transceivers; one or more processors; and one or more memories operably connectable to the one or more processors, and storing instructions of performing operations when the transmission of the SRS is executed by the one or more processors.

The operations include transmitting UE capability information associated with a sound reference signal (SRS) for downlink channel state information (DL CSI) acquisition, receiving configuration information related to transmission of the SRS, and transmitting the SRS.

The UE capability information is related to a plurality of panels, at least one SRS resource set is configured for each panel among the plurality of panels based on the UE capability information, and the SRS is transmitted based on at least one of the plurality of panels.

According to yet another embodiment of the present disclosure, a device includes: one or more memories; and one or more processors functionally connected to the one or more memories.

The one or more processors are configured to control the device to transmit UE capability information associated with a sound reference signal (SRS) for downlink channel state information (DL CSI) acquisition, receive configuration information related to transmission of the SRS, and transmit the SRS.

The UE capability information is related to a plurality of panels, at least one SRS resource set is configured for each panel among the plurality of panels based on the UE capability information, and the SRS is transmitted based on at least one of the plurality of panels.

According to still yet another embodiment of the present disclosure, one or more non-transitory computer-readable media store one or more instructions.

One or more instructions executable by one or more processors is configured to control a UE to transmit UE capability information associated with a sound reference signal (SRS) for downlink channel state information (DL CSI) acquisition, receive configuration information related to transmission of the SRS, and transmit the SRS.

The UE capability information is related to a plurality of panels, at least one SRS resource set is configured for each panel among the plurality of panels based on the UE capability information, and the SRS is transmitted based on at least one of the plurality of panels.

According to still yet another embodiment of the present disclosure, a method for receiving, by a base station (BS), a sounding reference signal (SRS) in a wireless communication system includes: receiving UE capability information associated with a sound reference signal (SRS) for downlink channel state information (DL CSI) acquisition; transmitting configuration information related to transmission of the SRS; and receiving the SRS.

The UE capability information may be related to a plurality of panels, at least one SRS resource set may be configured for each panel among the plurality of panels based on the UE capability information, and the SRS may be transmitted based on at least one of the plurality of panels.

According to still yet another embodiment of the present disclosure, a BS for receiving a sounding reference signal (SRS) in a wireless communication system includes: one or more transceivers; one or more processors; and one or more memories operably connectable to the one or more processors, and storing instructions of performing operations when the reception of the SRS is executed by the one or more processors.

The operations include receiving UE capability information associated with a sound reference signal (SRS) for downlink channel state information (DL CSI) acquisition; transmitting configuration information related to transmission of the SRS; and receiving the SRS.

The UE capability information is related to a plurality of panels, at least one SRS resource set is configured for each panel among the plurality of panels based on the UE capability information, and the SRS is transmitted based on at least one of the plurality of panels.

Advantageous Effects

According to an embodiment of the present disclosure, an SRS for an antenna switching usage, which is transmitted by a multi-panel UE is transmitted based on an SRS resource set configured for each panel. Accordingly, downlink channel state information can be obtained for each panel.

According to an embodiment of the present disclosure, a UE capable of simultaneous transmission through multi-panels transmits the SRS in at least one symbol according to a specific location among a plurality of candidate locations. Accordingly, when SRS resources based on different panels are configured in the same symbol, SRS transmission can be performed so that inter-beam interference of each SRS is minimized.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 is a flowchart illustrating an example of a CSI related procedure.

FIG. 11 is a flowchart for describing an operation of a UE to which a method proposed in the present disclosure may be applied.

FIG. 12 is a flowchart for describing an operation of a BS to which a method proposed in the present disclosure may be applied.

FIG. 13 is a flowchart for describing a method of transmitting, by a UE, a sounding reference signal in a wireless communication system according to an embodiment of the present disclosure.

FIG. 14 is a flowchart for describing a method for receiving, by a BS, a sounding reference signal in a wireless communication system according to another embodiment of the present disclosure.

FIG. 15 illustrates a communication system 1 applied to the present disclosure.

FIG. 16 illustrates wireless devices applicable to the present disclosure.

FIG. 17 illustrates a signal process circuit for a transmission signal.

FIG. 18 illustrates another example of a wireless device applied to the present disclosure.

FIG. 19 illustrates a hand-held device applied to the present disclosure.

MODE FOR DISCLOSURE

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
   36.211: Physical channels and modulation
   36.212: Multiplexing and channel coding
   36.213: Physical layer procedures
   36.300: Overall description
   36.331: Radio Resource Control (RRC)

3GPP NR
   38.211: Physical channels and modulation
   38.212: Multiplexing and channel coding
   38.213: Physical layer procedures for control
   38.214: Physical layer procedures for data
   38.300: NR and NG-RAN Overall Description
   36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15 [\text{kHz}]$ | Cyclic prefix |
|---|---|---|
| 0 | 15 | Normal |
| 1 | 30 | Normal |
| 2 | 60 | Normal, Extended |

TABLE 1-continued

| μ | $\Delta f = 2^\mu \cdot 15 [\text{kHz}]$ | Cyclic prefix |
|---|---|---|
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |

TABLE 3-continued

| μ | $N_{symb}^{slot}$ | $N_{slot}^{frame,\mu}$ | $N_{slot}^{subframe,\mu}$ |
|---|---|---|---|
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^{\mu}N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu}N_{sc}^{RB}$ subcarriers, and $2^{\mu}N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^{\mu}N_{sc}^{RB}-1$ is an index on a frequency domain, and l̄=0, . . . , $2^{\mu}N_{symb}^{(\mu)}-1$ refers to a location of a symbol in a subframe. The index pair (k,l̄) is used to refer to a resource element in a slot, where l=0, . . . , $N_{symb}^{\mu}-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Opeation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

```
-- ASN1START
-- TAG-TCI-STATE-START
TCI-State ::=           SEQUENCE {
   tci-StateId             TCI-StateId,
   qcl-Type1               QCL-Info,
   qcl-Type2               QCL-Info
   ...
}
QCL-Info ::=            SEQUENCE {
   cell                    ServCellIndex
   bwp-Id                  BMP-Id
   referenceSignal         CHOICE {
      csi-rs                  NZP-CSI-RS-ResourceId,
      ssb                     SSB-Index
   },
   qcl-Type                ENUMERATED {typeAr, typeB, typeC, typeD},
   ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

```
-- ASN1START
TAG-MAC-CELL-GROUP-CONFIG-START
SRS-Config ::=                              SEQUENCE {
  srs-ResourceSetToReleaseList                SEQUENCE (SIZE(1. .maxNrofSRS-
ResourceSets) ) OF SRS-ResourceSetId              OPTIONAL, -- Need N
  srs-ResourceSetToAddModList                 SEQUENCE (SIZE(1. .maxNrofSRS-
ResourceSets) ) OF SRS-ResourceSet                OPTIONAL, -- Need N
  srs-ResourceToReleaseList                   SEQUENCE (SIZE(1. .maxNrofSRS-
Resources) ) OF SRS-ResourceId                    OPTIONAL, -- Need N
  srs-ResourceToAddModList                    SEQUENCE (SIZE(1. .maxNrofSRS-
Resources) ) OF SRS-Resource                      OPTIONAL, -- Need N
  tpc-Accumulation                            ENUMERATED {disabled}
  ...
}
SRS-ResourceSet ::=                         SEQUENCE {
  srs-ResourceSetId                           SRS-ResourceSetId,
```

TABLE 6-continued

```
srs-ResourceIdList              SEQUENCE (SIZE(1. .maxNrofSRS-
ResourcesPerSet) ) OF SRS-ResourceId    OPTIONAL, -- Cond Setup
  resourceType                  CHOICE {
    aperiodic                     SEQUENCE {
      aperiodicSRS-ResourceTrigger    INTEGER (1. .maxNrofSRS-
TriggerStates-1),
      csi-RS                        NZP-CSI-RS-ResourceId
      slotOffset                    INTEGER (1. .32)
      ...
    },
    semi-persistent               SEQUENCE {
      associatedCSI-RS              NZP-CSI-RS-ResourceId
      ...
    },
    periodic                      SEQUENCE {
      associatedCSI-RS              NZP-CSI-RS-ResourceId
      ...
    }
  },
  usage                         ENUMERATED {beamManagement,
codebook, nonCodebook, antennaSwitching),
  alpha                         Alpha
  p0                            INTEGER (-202. .24)
  pathlossReferenceRS           CHOICE {
    ssb-Index                     SSB-Index,
    csi-RS-Index                  NZP-CSI-RS-ResourceId
SRS-SpatialRelationInfo ::=     SEQUENCE {
  servingCellId                 ServCellIndex
  referenceSignal               CHOICE {
    ssb-Index                     SSB-Index,
    csi-RS-Index                  NZP-CSI-RS-ResourceId,
    srs                           SEQUENCE {
      resourceId                    SRS-ResourceId,
      uplinkBWP                     BWP-Id
    }
  }
}
SRS-ResourceId ::=              INTEGER (0..maxNrofSRSResources-1)
```

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

Hereinafter, a CSI related procedure will be described.

FIG. 10 is a flowchart illustrating an example of a CSI related procedure.

Referring to FIG. 10, in order to perform one of usages of the CSI-RS, a terminal (e.g., user equipment (UE)) receives, from a base station (e.g., general Node B or gNB), configuration information related to the CSI through radio resource control (RRC) signaling (S1010).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

The CSI resource configuration related information may be expressed as CSI-ResourceConfig IE. The CSI resource configuration related information defines a group including at least one of a non zero power (NZP) CSI-RS resource set, a CSI-IM resource set, or a CSI-SSB resource set. In other words, the CSI resource configuration related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

Table 7 shows an example of NZP CSI-RS resource set IE. Referring to Table 7, parameters (e.g., a BM related 'repetition' parameter and a tracking related 'trs-Info' parameter) representing the usage may be configured for each NZP CSI-RS resource set.

TABLE 7

```
-- ASN1START
-- TAG-NZP-CSI-RS-RESOURCESET-START
NZP-CSI-RS-ResourceSet ::=            SEQUENCE {
    nzp-CSI-ResourceSetId             NZP-CSI-RS-ResourceSetId,
    nzp-CSI-RS-Resources              SEQUENCE (SIZE (1. .maxNrofNZP-CSI-RS-
ResourcesPerSet) ) OF NZP-CSI-RS-ResourceId,
    repetition                        ENUMERATED { on, off }
    aperiodicTriggeringOffset         INTEGER(0. .4)
    trs-Info                          ENUMERATED {true}
    . . .
}
-- TAG-NZP-CSI-RS-RESOURCESET-STOP
-- ASN1STOP
```

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting. The time domain behavior may be periodic, aperiodic, or semi-persistent.

The CSI report configuration related information may be expressed as CSI-ReportConfig IE and Table 8 below shows an example of CSI-ReportConfig IE.

TABLE 8

```
-- ASN1START
-- TAG-CSI-RESOURCECONFIG-START
CSI-ReportConfig ::=                         SEQUENCE {
    reportConfigId                           CSI-ReportConfigId,
    carrier                                  ServCellIndex                OPTIONAL, -
- Need S
    resourcesForChannelMeasurement           CSI-ResourceConfigId,
    csi-IM-ResourcesForInterference          CSI-ResourceConfigId         OPTIONAL, -
- Need R
    nzp-CSI-RS-ResourcesForInterference      CSI-ResourceConfigId         OPTIONAL, -
- Need R
    reportConfigType                         CHOICE {
        periodic                             SEQUENCE {
            reportSlotConfig                 CSI-
ReportPeriodicityAndOffset,
            pucch-CSI-ResourceList           SEQUENCE (SIZE
(1. .maxNrofBWPs) ) OF PUCCH-CSI-Resource
        },
        semiPersistentOnPUCCH                SEQUENCE {
            reportSlotConfig                 CSI-
ReportPeriodicityAndOffset,
            pucch-CSI-ResourceList           SEQUENCE (SIZE
```

TABLE 8-continued

```
(1. .maxNrofBWPs) ) OF PUCCH-CSI-Resource
        },
        semiPersistentOnPUSCH           SEQUENCE {
        reportSlotConfig                    ENUMERATED {s15, s110, s120,
s140, s180, s1160, s1320},
        reportSlotOffsetList                SEQUENCE (SIZE (1. . maxNrofUL-
Allocations) ) OF INTEGER(0. .32),
        p0alpha                             P0-PUSCH-AlphaSetId
        },
        aperiodic                        SEQUENCE {
        reportSlotOffsetlist                SEQUENCE (SIZE (1. .maxNrofUL-
Allocations) ) OF INTEGER(0. .32)
        }
    },
    reportQuantity                   CHOICE {
        none                                NULL,
        cri-RI-PMI-CQI                      NULL,
        cri-RI-i1                           NULL,
        cri-RI-i1-CQI                       SEQUENCE {
        pdsch-BundleSizeForCSI              ENUMERATED {n2, n4}
OPTIONAL
        },
        cri-RI-CQI                          NULL,
        cri-RSRP                            NULL,
        ssb-Index-RSRP                      NULL,
        cri-RI-LI-PMI-CQI                   NULL
    },
```

The UE measures CSI based on configuration information related to the CSI (S1020). The CSI measurement may include (1) a CSI-RS reception process of the UE (S1021) and (2) a process of computing the CSI through the received CSI-RS (S1022), and a detailed description thereof will be made below.

For the CSI-RS, resource element (RE) mapping is configured time and frequency domains by higher layer parameter CSI-RS-ResourceMapping.

Table 9 shows an example of CSI-RS-ResourceMapping IE.

Here, when a quantity of CSI-ReportConfig of Table 10 is configured to 'none (or No report)', the UE may skip the report.

However, even when the quantity is configured to 'none (or No report)', the UE may report the measured CSI to the BS.

The case where the quantity is configured to 'none (or No report)' is a case of triggering aperiodic TRS or a case where repetition is configured.

Here, only in a case where the repetition is configured to 'ON', the report of the UE may be omitted.

TABLE 9

```
-- ASN1START
-- TAG-CSI-RS-RESOURCEMAPPING-START
CSI-RS-ResourceMapping ::=      SEQUENCE {
    frequencyDomainAllocation       CHOICE {
        row1                            BIT STRING (SIZE (4) ),
        row2                            BIT STRING (SIZE (12) ),
        row4                            BIT STRING (SIZE (3) ),
        other                           BIT STRING (SIZE (6) )
    },
    nrofPorts                       ENUMERATED {p1,p2,p4,p9,p12,p16,p24,p32},
    firstOFDMSymbolInTimeDomain     INTEGER (0. .13)
    firstOFDMSymbolInTimeDomain2    INTEGER (2. .12)
    cdm-Type                        ENUMERATED {noCDM, fd-CDM2, cdm4-FD2-TD2, cdm8-
FD2-TD4},
    density                         CHOICE {
        dot5                            ENUMERATED {evenPRBs, oddPRBs},
        one                             NULL,
        three                           NULL,
        spare                           NULL
    },
    freqBand                        CSI-FrequencyOccupation,
    . . .
}
```

In Table 9, a density (D) represents a density of the CSI-RS resource measured in RE/port/physical resource block (PRB) and nrofPorts represents the number of antenna ports.

The UE reports the measured CSI to the BS (S1030).

Hereinafter, an SRS for antenna switching will be described in detail.

SRS for 'antennaSwitching'

The SRS may be used for acquisition of DL channel state information (CSI) (i.e., DL CSI acquisition). As a specific example, in a single cell or multi cell (e.g., CA) situation based on TDD, a base station (BS) may schedule transmission of the SRS to a user equipment (UE), and then measure the SRS from the UE. In this case, the BS may perform scheduling of a DL signal/channel to the UE based on measurement by the SRS by assuming DL/UL reciprocity. In this case, in relation to DL CSI acquisition based on the SRS, the SRS may be configured for an antenna switching usage.

As an example, according to a specification (e.g., 3gpp TS38.214), the usage of the SRS may be configured to the BS and/or the UE by using a higher layer parameter (e.g., a usage of RRC parameter SRS-ResourceSet). In this case, the usage of the SRS may be configured as a beam management usage, a codebook transmission usage, a non-codebook transmission usage, an antenna switching usage, etc.

Hereinafter, a case where the SRS transmission (i.e., transmission of an SRS resource or an SRS resource set) is configured for the antenna switching usage among the usages will be described in detail.

As an example, in the case of a terminal with a partial reciprocity, SRS transmission based on antenna switching (i.e., transmission antenna switching) may be supported for downlink (DL) channel state information (CSI) acquisition through the SRS transmission in a situation such as time division duplex (TDD). When the antenna switching is applied, approximately 15 μs may be required between SRS resources (and/or the SRS resource and the resource between PUSCH/PUCCH) in a general case for the antenna switching of the UE. By considering such a point, a (minimum) guard period shown in Table 10 below may be defined.

TABLE 10

| μ | $\Delta f = 2^\mu \cdot 15$ [kHz] | Y [symbol] |
|---|---|---|
| 0 | 15 | 1 |
| 1 | 30 | 1 |
| 2 | 60 | 1 |
| 3 | 120 | 2 |

In Table 10, μ represents numerology, Δf represents a subcarrier spacing, and Y represents the number of symbols of the guard period, i.e., a length of the guard period. Referring to Table 10, the guard period may be configured based on a parameter μ for determining the numerology. In the guard period, the UE may be configured not to transmit any other signal, and the guard period may be configured to be intactly used for the antenna switching. As an example, the guard period may be configured by considering SRS resources transmitted in the same slot. In particular, when the UE is configured and/or instructed to transmit an aperiodic SRS configured to intra-slot antenna switching, the corresponding UE may transmit the SRS by using different transmission antennas for each designated SRS resource, and the guard period may be configured between respective resources.

Further, when the UE is configured with the SRS resource and/or the SRS resource set configured for the antenna switching usage through the higher layer signaling, the corresponding UE may be configured to perform the SRS transmission based on the UE capability related to the antenna switching. Here, the capability of the UE related to the antenna switching may be '1T2R', '2T4R', '1T4R', '1T4R/2T4R', '1T1R', '2T2R', '4T4R', etc. Here, 'mTnR' may mean a UE capability supporting m transmissions and n receptions.

(Sample S1) For example, in the case of a UE that supports 1T2R, up to two SRS resource sets may be configured as different values for resourceType of a higher layer parameter SRS-ResourceSet. Here, each SRS resource set may have two SRS resources transmitted in different symbols, and each SRS resource may constitute a single SRS port in a given SRS resource set. Further, an SRS port for a second SRS resource in the SRS resource set may be configured to be associated with a different UE antenna port from an SRS port for a first SRS resource in the same SRS resource set.

(Sample S2) As another example, in the case of a UE that supports 2T4R, up to two SRS resource sets may be configured as different values for resourceType of the higher layer parameter SRS-ResourceSet. Here, each SRS resource set may have two SRS resources transmitted in different symbols, and each SRS resource may constitute a single SRS port in a given SRS resource set. Further, an SRS port pair for the second SRS resource in the SRS resource set may be configured to be associated with a different UE antenna port from the SRS port pair for the first SRS resource in the same SRS resource set.

(Sample S3) As yet another example, in the case of a UE that supports 1T4R, the SRS resource sets may be configured in different schemes according to whether the SRS transmission is configured to be periodic, semi-persistent, and/or aperiodic. First, when the SRS transmission is configured to be periodic or semi-persistent, one SRS resource set constituted by 0 SRS resource set or four SRS resources configured based on for the resourceType of the higher layer parameter SRS-ResourceSet may be configured to be transmitted in different symbols. In this case, each SRS resource may constitute the single SRS port in the given SRS resource set, and the SRS port for each SRS resource may be configured to be associated with different UE antenna ports. Unlike this, when the SRS transmission is configured to be aperiodic, two SRS resource sets constituted by 0 SRS resource set or a total of four SRS resources configured based on for the resourceType of the higher layer parameter SRS-ResourceSet may be configured to be transmitted in different symbols of two different slots. In this case, the SRS ports for respective SRS resources in two given SRS resource sets may be configured to be associated with different UE antenna ports.

(Sample S4) As still yet another example, in the case of the UE that supports 1T1R, 2T2R, or 4T4R, up to two SRS resource sets of which each is constituted by one SRS resource may be configured for the SRS transmission, and the number of SRS ports of each SRS resource may be configured to 1, 2, or 4.

When an indicated UE capability is 1T4R/2T4R, the corresponding UE may expect that SRS ports (e.g., 1 or 2) of the same number will be configured for all SRS resources in the SRS resource set(s). Further, when the indicated UE capability is 1T2R, 2T4R, 1T4R, or 1T4R/2T4R, the corresponding UE may not expect that one or more SRS resource sets configured for the antenna switching usage in the same slot will be configured or triggered. Further, even when the indicated UE capability is 1T1R, 2T2R, or 4T4R, the corresponding UE may not expect that one or more SRS resource sets configured for the antenna switching usage in the same slot will be configured or triggered.

The contents described above may be applied in combination with methods proposed in the present disclosure to be described below or may be supplemented to clarify technical features of the methods proposed in the present disclosure. Methods to be described below are just distinguished for convenience and it is needless to say that some components of any one method may be substituted with some components of another method or may be applied in combination with each other.

Hereinafter, matters related to the SRS transmission of the multi-panel UE will be described in detail.

It is assumed that SRS transmission for antenna switching for efficiently acquiring the downlink channel state information (DL CSI) is supported for a UE in which the number of transmission antennas (Tx antennas) is smaller than the number of reception antennas (Rx antennas) in Rel-15 NR MIMO. The UE that supports the antenna switching may report, to the BS, one of {"1T2R", "1T4R", "2T4R", "1T4R/2T4R", "T=R"} as the UE capability information, and the BS may configure the SRS resource set and the SRS resource for the antenna switching corresponding to the corresponding UE capability, and indicate the transmission. Further, the BS should configure a symbol gap according to numerology to be set between resources (as the guard period) at the time of configuring a time domain position of the resource in the SRS resource set for the antenna switching usage by considering an antenna switching time required for the antenna switching of the UE. More specific contents are described in Table 10 above and a description thereof.

Enhancement for panel-specific UL transmission is performed in Rel-16 NR eMIMO, and when a concept of 'panel' is introduced even in an antenna switching procedure, issues which should be additionally considered may occur, which include multi-panel simultaneous transmission, a beam indication for each panel, a panel switching time, etc. In the present disclosure, an antenna switching operation of the multi-panel UE will be clearly defined by considering the above-described issues, and an antenna switching configuring/indicating method of the BS for the corresponding operation, and a subsequent UE operation will be described.

Hereinafter, agreements related to multi-beam enhancement which may be applied to the method proposed in the present disclosure will be described.

1. Agreement (Panel-Specific UL Transmission)

In Rel-16, an identifier (ID) is supported, which may be used for representing the panel-specific UL transmission. The corresponding identifier may be utilizing or modifying an existing definition. Alternatively, the corresponding identifier may be newly defined.

2. Agreement (Number of Spatial Relations for PUCCH)

For UL beam management latency reduction in controlling PUCCH spatial relation, the maximum RRC configurable number of spatial relations for PUCCH (i.e., maxNrofSpatialRelationInfos) is increased to be 64 per BWP.

3. Agreement (ID for Panel-Specific UL Transmission)

The identifier (ID) which may be used for representing the panel-specific UL transmission may be one of the following Alt.1 to Alt.4.
  Alt.1: SRS resource set ID
  Alt.2: ID, which is directly associated to a reference RS resource and/or resource set
  Alt.3: ID, which is directly associated to a reference RS resource and/or resource set
  Alt.4: ID which is additionally configured in spatial relation info The multi-panel UE (MPUE) may be classified as follows.

MPUE-Assumption1: Multiple panels are implemented on a UE and only one panel can be activated at a time, with panel switching/activation delay of [X] ms.

MPUE-Assumption2: Multiple panels are implemented on a UE and multiple panels can be activated at a time and one or more panels can be used for transmission.

MPUE-Assumption3: Multiple panels are implemented on a UE and multiple panels can be activated at a time but only one panel can be used for transmission.

The multi-panel UE may be based on any one of MPUE assumption-1 to MPUE assumption-3. However, according to an implementation scheme of the multi-panel UE, the multi-panel UE may be based on at least one of assumption-1 to assumption-3 described above. Further, the classification of the multi-panel UE is just an example, and the multi-panel UE may be classified differently from the listed scheme.

Hereinafter, an antenna switching configuring/indicating method of the BS for the multi-panel UE, and a UE/BS operating method according to the corresponding method will be proposed.

As described above, the multi-panel UE may be classified into three following types.

A UE in which multiple panels may not be simultaneously activated and only one panel may be activated at one timing. The corresponding UE may be based on MPUE-assumption 1 above.

A UE in which multiple panels may be simultaneously activated and one or more multiple panels are utilizable even at the time of transmission. The corresponding UE may be based on MPUE-assumption 2 above.

A UE in which multiple panels may be simultaneously activated and only one panel is utilizable at the time of transmission. The corresponding UE may be based on MPUE-assumption 3 above.

Proposals to be described below may be a proposal corresponding only to one type of UE among three types of UEs, and on the contrary, may also be a proposal corresponding all of two types or three types of UEs.

[Proposal 1]

Hereinafter, a UE capability for the panel switching operation and the SRS resource setting for the panel switching will be described.

The numbers of Tx panels and Tx panels which are utilizable by the UE may be defined as a UE capability. When the number of Tx panels is equal to or smaller than the number of Rx panels, a 'panel switching' operation of transmitting the SRS for each panel for acquiring the downlink channel state information (DL CSI) for each panel may be defined/configured.

The UE capability for the panel switching may be defined as the following formats.
  "1Tp2Rp"(=one Tx panel two Rx panel)
  "2Tp4Rp"(=two Tx panel four Rx panel)
  "1Tp4Rp"(=one Tx panel four Rx panel)

The UE may report, to the BS, capability information for the panel switching.

When the SRS resource set(s) for the antenna switching usage may be configured for each panel, whether the corresponding SRS resource set(s) configured for each panel may be simultaneously transmitted may be defined as a capability.

Specifically, whether the BS may configure an individual SRS resource set(s) configured for each panel in the same slot or/and whether the BS may transmit the individual SRS resource set(s) or even whether the BS may configure SRS resources included in the individual SRS resource set configured for each panel in the same symbol and/or whether the UE may transmit the SRS resources may be defined as the UE capability.

When the capability of the UE is "1Tp2Rp", the existing Rel-15 NR antenna switching (e.g., "1T2R") may be indicated for each Rx panel. The UE may have the SRS resource set for the antenna switching usage related to each Rx panel. In this case, the SRS resource set for the antenna switching usage may be configured to the UE for each Rx panel. In this case, a concept of "1Tp2Rp" may be a higher level concept than "1T2R" by one step. A set (i.e., SRS resource setting for panel switching) of a higher concept enclosing a plurality of SRS resource sets from each panel needs to be newly defined.

Further, the multi-panel UE may report the capability information for the antenna switching equally or differently per panel.

For example, a case where a panel switching capability of a 2-panel UE is "1Tp2Rp", and "1T2R" is supported in a first panel and "1T4R" is supported in a second panel for each panel is assumed. In this case, in the capability related to the SRS resource setting for the panel switching, the UE may be configured to report, to the BS, integrated capability information by considering hierarchies of the panel switching and the antenna switching as in {"1Tp2Rp" with "1T2R" for panel0 and "1T4R" for panel1}. Through this, the BS may configure/indicate, to the UE, the SRS for the panel switching and the antenna switching corresponding to the corresponding capability information.

Additionally, whether the SRS may be simultaneously transmitted based on the SRS resource set related to each panel and/or a time required for switching the panel may be included in the integrated capability information. For example, the UE may report, to the BS, capability information such as {"1Tp2Rp" with "1T2R" for panel0 and "1T4R" for panel1, whether the SRS resource set of each panel may be simultaneously transmitted (O or X), and the time required for switching the panel}.

The following configuration/indication may be considered with respect to which SRS resource set is related to which panel.

Specifically, in a higher layer configuration for configuring the SRS resource set from the BS (e.g., within SRS-ResourceSet which is IE of 3gpp TS 38.331 SRS-config), which panel the corresponding SRS resource set corresponds to may be configured/indicated.

The panel configuration/indication may be delivered to the DL CSI report of the UE, and the BS. When the UE reports the downlink channel state information (DL CSI) based on reception of the CSI-RS after reporting the number of Tx panels and the number of Rx panels, the UE may make a panel index be included. Through this, the BS may acquire a channel situation for each panel, and reflect the acquired channel situation to the SRS resource setting. The UE may report the integrated capability information for the SRS resource setting for panel switching according to a configuration/indication between the corresponding SRS resource set and the UE panel, and may operate based on a subsequent BS configuration/indication for the panel switching.

Hereinafter, an embodiment of the integrated capability information will be described=.

[Method 1-1]

In the case of the UE in which one or multiple panels are utilizable at the time of transmission like MPUE-assumption 2, the integrated capability information may be reported as follows.

The corresponding UE may report, to the BS, capability information such as {"1Tp2Rp" with "1T2R" for panel0 and "1T4R" for panel1, whether the SRS resource set of each panel may be simultaneously transmitted: O, and the time required for switching the panel: 0 ms (optional)}.

The integrated capability information may include the information on whether the SRS resource set may be simultaneously transmitted. Further, the integrated capability information may optionally include the information on the panel switching delay.

[Method 1-2]

In the case of the UE in which only one panel is utilizable at the time of transmission like MPUE-assumption 1 and MPUE-assumption 3, the integrated capability information may be reported as follows.

The corresponding UE may report, to the BS, capability information such as {"1Tp2Rp" with "1T2R" for panel0 and "1T4R" for panel1, whether the SRS resource set of each panel may be simultaneously transmitted: X, and the time required for switching the panel: 2 ms (reporting is required)}.

The integrated capability information may include the information on whether the SRS resource set may be simultaneously transmitted and the panel switching delay. The panel switching delay may be requisitely included in the integrated capability information.

The reporting of the panel switching delay may be required or optional according to whether the SRS resource set may be simultaneously transmitted. The reason is that if the SRS resource set may be simultaneously transmitted, only a time required for turning on the panel (a time required for activating the panel) without considering the panel switching delay is considered.

[Method 1-3]

Items included in the integrated capability information based on Method 1-1 and/Method 1-2 above may be individually reported. As an example, the UE may individually report, to the BS, the information on the panel switching delay or whether the SRS resource set may be simultaneously transmitted.

[Proposal 2]

Hereinafter, a method for reducing inter-SRS beam interference at the time of an SRS configuration for the UE capable of simultaneously transmitting multi-panels (e.g., UE of MPUE-assumption 2) and at the time of simultaneously transmitting multi-panels will be described.

In the multi-panel UE (MPUE-assumption 2) in which multi-panels may be simultaneously activated, and one or a plurality of panels is utilizable even at the time of uplink transmission, if an SRS resource for the antenna switching usage is connected to different UE panels, SRS resources of each panel may be utilized for transmitting an SRS resource of another panel. Specifically, the BS may configure/instruct to the UE to transmit the SRS of another panel simultaneously (in the same symbol) in an SRS resource of any one panel among the multi-panels.

Specifically, the SRS resource set for the antenna switching for each panel of the multi-panel UE may separately exist. For convenience of description, this is referred to as an SRS resource set per panel. The term is just used for distinguishing from an SRS resource set without a panel related limitation, and a technical scope is not intended to be limited to the corresponding term.

The BS may configure the SRS resource set for each of the plurality of panels to the corresponding UE in the same slot. In other words, the BS may configure SRS resource sets based on different panels in the same slot.

Further, the BS may configure the SRS resource which belongs to the SRS resource set for each of the plurality of panels in the same slot. The corresponding UE may transmit SRSs based on different panels in the same symbol.

It is impossible for a UE based on MPUE-assumption 1 and MPUE-assumption 3 in which only one panel is utilizable at the time of uplink transmission to simultaneously respective SRSs through the SRS resources based on different panels. The operation of the UE based on MPUE-assumption 2 described above is impossible. Accordingly, the panel switching delay should be considered between SRS transmissions from different panels.

Further, the following operation may be considered so as to minimize inter-beam interference between the SRS resources simultaneously transmitted by the UE (in the multi-panels).

The BS may i) configure only one time domain symbol level location of the SRSA resource or ii) configure the time domain symbol level location in a time domain symbol level position candidate set form, to the UE.

When the simultaneously transmitted SRS resources are configured/triggered through the configuration, the BS may configure/indicate/update each SRS resource so that SRS beam interference from two panels is minimized through MAC/CE/DCI. That is, the BS may configure/indicate/update a combination in which the beam interference is minimized in the set, to the UE.

The following matters related to channel estimation for the UE such as MPUE-assumption 2 capable of simultaneously transmitting the SRSs based on different panels may be considered. In order to increase a channel estimation capability for the SRSs transmitted based on different panels (based on the SRS resource of the SRS resource set for each of different panels) in the same symbol, it may be preferable that the SRS is transmitted through an orthogonal beam between respective SRS resources. Here, orthogonal may mean that directions of respective beams are different, so the beams do not overlap with each other.

In order to improve the channel estimation capability of the BS, the inter-beam interference of he SRSs which are simultaneously transmitted based on different panels may be considered.

For example, when candidate positions of the symbol level position of the SRS resource are indexed from a last symbol of the subframe as 0 to 5, the UE/BS may operate as in Samples 1 and 2 below according to a consecutive symbol duration value. For reference, in the case of Rel-15 NR, a starting potion is configured to one of 0 to 5 through RRC and consecutive symbol numbers 1, 2, and 4 are configured.

Sample 1) When the consecutive symbol duration is 1: The BS may configure the symbol level position candidate set to the UE through the RRC as follows.

SRS resource 1 (from panel 1)={3, 5}
SRS resource 2 (from panel 1)={3, 5}
SRS resource 3 (from panel 2)={3, 5}
SRS resource 4 (from panel 2)={3, 5}

The BS may indicate a specific combination among the candidate sets to the UE through the MAC CE/DCI as follows.

SRS resource 1 (from panel 1)={3}
SRS resource 2 (from panel 1)={5}
SRS resource 3 (from panel 2)={5}
SRS resource 4 (from panel 2)={3}

The BS may configure/indicate/update whether SRS resource 1 and SRS resource 4 are simultaneously transmitted and SRS resource 2 and SRS resource 3 are simultaneously transmitted through the MAC CE or DCI n bits.

Through a dynamic configuration/indication for the symbol level position for the SRS resource as described above, the inter-beam interference of the SRS resources to be simultaneously transmitted from the respective panels may be minimized.

The method may reduce signaling overhead, and when the number of panels of the UE which are simultaneously transmitted is larger than 2, the corresponding effect t may be prominent.

Specifically, the signaling overhead is reduced in a configuration between the BS and the UE to arrange the beams so that the inter-beam interference is small by configuring the candidates at the symbol level position of each SRS resource as compared with updating all spatial relations in order to reduce the inter-beam interference of the respective SRS resources transmitted from different panels.

Further, the embodiment may be applied to a case where SRSs of a plurality of UEs are multiplexed in a limited time-frequency domain. In order to reduce SRS inter-beam interference of UEs scheduled to simultaneously transmit the SRSs, the BS may configure the symbol level position of the SRS resource of each UE.

Sample 2) When the consecutive symbol duration is 2 or more: The BS may configure/indicate a symbol level starting position candidate and symbol durations 1, 2, and 4 to the UE through the RRC in a combination form.

SRS resource 1 (from panel 1)={(starting=3,duration=2), (starting=5,duration=1)}
SRS resource 2 (from panel 1)={(starting=3,duration=2), (starting=5,duration=1)}
SRS resource 3 (from panel 2)={(starting=3,duration=2), (starting=5,duration=1)}
SRS resource 4 (from panel 2)={(starting=3,duration=2), (starting=5,duration=1)}

The BS may configure/indicate by which order pair the configured sets are to be down-selected and transmitted for each SRS resource among the configured sets through the MAC CE or DCI n bits.

The operation between the BS and the UE may be extensively applied even to a case where the number of panels of the UE is 3 or more (e.g., 4). A configuration/indication of information (e.g., a candidate set configuration, and an indication of a specific set among the candidate sets) according to Proposal 2 above may be related to the SRS resource setting for the panel switching of Proposal 1 above. As an example, the candidate set may be configured/indicated through the SRS resource setting for the panel switching.

[Proposal 3]

Hereinafter, an SRS configuration in a UE (e.g., a UE of MPUE-assumption 1 or MPUE-assumption 3) in which simultaneous transmission of multi-panels is impossible, an SRS configuration considering the panel switching delay, and a UE/BS operation related to the corresponding configuration will be described.

In a UE (MPUE-assumption 1) in which multi-panels may not be activated simultaneously and only one panel may be activated at one timing and a UE (MPUE-assumption 3) in which multi-panels may be activated, but only one panel is utilizable at the time of transmission, the following method may be considered.

When the SRS resource set for the antenna switching usage is connected to different UE panels in the above-described UE (based on MPUE-assumption 1 or MPUE-assumption 3), the BS may configure the SRS resource setting by considering a time (e.g., panel switching delay) required for the corresponding UE to switch the panel.

Specifically, the BS may configure a guard period or a gap period for panel switching between respective SRS resource sets. Accordingly, the ambiguity on the UE operation may be prevented.

The 'guard period for panel switching' may be configured/indicated through the SRS resource setting for panel switching of Proposal 1 above. That is, the SRS resource setting may be constituted by a combination of SRS resource sets (SRS resource sets for antenna switching) configured for each panel by considering the guard period for panel switching.

In other words, the SRS resource set for antenna switching and the SRS resource setting for panel switching may be configured in a hierarchical structure. Specifically, in each panel, at least one SRS resource set for antenna switching may be configured. In this case, the SRS resource setting for panel switching, which may bind (or includes) the configured sets (by considering the 'guard period for panel switching') may be configured. An example of UE capability information (Proposal 1) related thereto is as follows.

{"1Tp2Rp" with "1T2R" for panel0 and "1T4R" for panel1, whether the SRS resource set of each panel may be simultaneously transmitted: X, and the time required for switching the panel: 2 ms (reporting is required)}

The BS may configure the guard period for panel switching by utilizing the SRS resource setting for panel switching. Specifically, the BS may configure the 'guard period for panel switching' by setting a slot level time domain gap considering the panel switching delay for each UE capability between the 'SRS resource sets for antenna switching' of each panel.

The BS may configure the SRS resource set for antenna switching from each panel throughout one or two slots in the same manner as the existing REL-15. The BS may configure the SRS resource in a form considering a symbol gap for antenna switching in the corresponding slot.

Through the scheme, the BS may configure/indicate, to the UE, the 'guard period for panel switching' and the 'symbol gap for antenna switching' in the hierarchical structure.

According to an embodiment, the UE/BS may operate in relation to the SRS resource setting for panel switching as follows.

It is assumed that the UE incapable of simultaneously transmitting the SRS resource, such as MPUE-assumption 1 and MPUE-assumption 3 includes two panels and the antenna switching related capability for each panel is "1T2R". In this case, the UE may report, to the BS, that the UE capability related to the antenna switching is "1T4R" by considering up to the panel switching.

The UE may support up to the panel switching by maintaining the antenna switching capability of the existing scheme. The UE may separately report, to the BS, only the guard period for panel switching) (e.g., 2 ms or the number of slots)' as the UE capability.

The operation of the UE may be performed in a UE capability range during the panel switching through the operation between the BS and the UE.

The time (e.g., panel switching delay) required for switching the panel of each panel may be defined as the UE capability (e.g., the guard period for panel switching) as described above. The UE reports the corresponding capability to the BS not to expect the SRS resource sets from each panel, which are configured/indicated in a state to be separated at a smaller time interval than the corresponding delay. The BS may configure/indicate the SRS resource setting for panel switching so as to place the guard period for panel switching between the SRS resource sets of each panel by considering the reported capability information (panel switching delay). When an SRS transmission indication to another panel is received from the BS within the 'guard period for panel switching' of the UE, the corresponding SRS transmission indication is discarded or the indicated SRS is transmitted by maintaining a previously transmitted panel as it is.

There may be SRS resource sets (SRS resource sets for antenna switching) for two or more (e.g., four) panels within panel switching SRS resource setting.

[Proposal 4]

Hereinafter, a UE operation when the panel receiving the DCI for triggering the SRS and the panel to transmit the SRS do not match each other will be described.

In a UE (MPUE-assumption 1) in which multi-panels may not be simultaneously activated, and only one panel may be activated at one timing and in a UE (MPUE-assumption 3) in which multi-panels may be simultaneously activated, but only one panel is utilizable at the time of transmission, the following method may be considered.

When a panel switching guard period is defined as the UE capability information, the Rx panel receiving the DL/UL DCI for triggering the SRS and the Tx panel of the indicated SRS may be different. In this case, the UE may operate as follows.

1) If a temporal location of the SRS triggered from a DCI reception timing is after the panel switching guard period, the UE may normally transmit the SRS after the panel switching in response to the DCI indication.

2) If the temporal location of the SRS triggered from the DCI reception timing is within the panel switching guard period, the UE may use a pre-defined default UL panel. The pre-defined default UL panel may include a UL panel corresponding to a lowest CORESET, and a pre-defined/configured fallback UL panel.

Alternatively, the UE may transmit the SRS by using a UL panel which corresponds to (or is the same as) a DL panel (Rx panel) used when receiving the DCI.

Hereinafter, an example of a UE/BS operation based on at least one of Proposals 1 to 4 described above is as follows.

Step 0) The UE reports, to the BS, a panel related capability (the number of Tx/Rx panels, whether multi-panels may be simultaneously transmitted, and the panel switching delay).
    Step 0-1) Perform reporting as in Proposal 1
        Step 0-1-1) Simultaneous transmission for each panel is possible→Proposal 2
        Step 0-1-2) Simultaneous transmission for each panel is impossible→Proposal 3
Step 1) The UE receives the SRS configuration from the BS.
    Step 1-1) Receive a configuration for transmitting the SRS
    Step 0-1-1) Information which may be included in the configuration is (TS 38.331 SRS-Config)
    Step 1-2) Transmit the SRS peroiodically/semi-statically/aperiodically
Step 2) When a) A timing when the UE receives, from the BS, SRS trigger through UL/DL grant (through PDCCH) orb) an RRC/MAC CE configuration based on SRS transmission timing arrives
    Step 2-1) UE capable of simultaneous transmission for each panel
        Step 2-1-1) Operation by Proposal 2
    Step 2-2) UE incapable of simultaneous transmission for each panel Step 2-2-1) Operation by Proposal 3
Step 2-3) When the SRS is triggered through the DCI, but the DCI receiving panel and the panel to transmit the SRS are different
Step 2-3-1) Operation by Proposal 4

All of the respective steps are not required, and some step may be omitted according to a situation of the UE.

Hereinafter, effects according to Proposals 1 to 4 will be described in detail.

The effect according to Proposal 1 is as follows. When beamforming is utilized (in a band of FR 2 or more), a channel situation between multi-panels mounted on the BS and the UE may vary for each panel. When the number of Tx panels is equal to or smaller than the number of Rx panels, it is possible to acquire the DL CSI for each panel.

The effect of Proposal 2 is as follows. By considering the panel switching delay which may have a larger switching gap than the existing NR antenna switching, simultaneous transmission from multi-panels may be supported in transmitting the SRS for the antenna switching usage. Further, an arrangement of SRS beams of each panel, which are transmitted in the same symbol may be performed so that interference between respective SRS beams is small. The location of the SRS resource may be dynamically configured/indicated so that the inter-beam interference of the simultaneously transmitted SRSs is small.

The effect of Proposal 3 is as follows. When the UE antenna switching for the DL CSI acquisition usage is supported even between two or more panels, a UE operation considering the panel switching period is defined. An impractical UE operation may be prevented by considering a time (e.g., panel switching delay) required for the UE which may not utilize two panels together for transmission to switch the panel. That is, since the UE transmits the SRS within a range of a capability related to panel switching, reliability of SRS transmission for antenna switching may be secured.

The effect of Proposal 4 is as follows. When the Rx panel receiving the DL/UL DCI in which the SRS is triggered and the Tx panel of the indicated SRS are different, the ambiguity of the UE operation may be resolved, which may occur according to the UE capability.

In terms of implementation, the operations (e.g., operations related to the SRS based on at least one of Proposals 1 to 4) of the BS/UE according to the above-described embodiments may be processed by devices (e.g., processors 102 and 202 in FIG. 16) in FIGS. 15 to 19 to be described below.

Further, the operations (e.g., operations related to the SRS based on at least one of Proposals 1 to 4) of the BS/UE according to the above-described embodiments may be stored in memories (e.g., reference numerals 104 and 204 in FIG. 16) in the form of a command/program (e.g., instruction or executable code) for driving at least one processor (e.g., reference numerals 102 and 202 in FIG. 16).

Hereinafter, the above-described embodiments will be described in terms of the operations of the UE/BS with reference to FIGS. 11 and 12.

FIG. 11 is a flowchart for describing an operation of a UE to which a method proposed in the present disclosure may be applied. FIG. 11 is just for convenience of the description and does not limit the scope of the present disclosure.

Referring to FIG. 11, a case where in performing the CSI acquisition/reporting operation, the UE performs uplink transmission (e.g., UL channel, additional SRS, etc.) based on the above-described embodiments is assumed.

The UE may report, to the BS, a panel related UE capability (e.g., a UE capability related to panel based SRS transmission/panel switching) (S1110). As an example, the UE may perform UE capability reporting as in step 0) of the above-described method, and this may be performed through the higher layer signaling. In this case, the UE may also report information on the UE capability related to CSI acquisition/reporting.

The UE may receive, from the BS, the SRS configuration related to the CSI acquisition/reporting (S1120). As an example, as in step 1) of the above-described method, the UE may receive an SRS configuration including information related to transmission of the SRS (e.g., SRS-config). In this case, the corresponding SRS configuration may be delivered through the higher layer signaling.

The UE may receive the SRS related to the operation of the CSI acquisition/reporting and/or DCI related to transmission such as the UL channel (S1130). However, the corresponding step may also be replaced with the RRC configuration/MAC CE as mentioned in step 2) of the above-described method.

Thereafter, in the operation of the CSI acquisition/reporting, the UE may transmit the SRS and/or the UL channel(s) based on the received SRS configuration, DCI, and/or a pre-defined (e.g., priority rule, etc.) (S1140). As an example, in multi symbol SRS transmission, the UE may transmit the SRS and/or UL channel(s) based on the rule (e.g., specifically, Proposals 2, 3, and 4) described in the above-described method.

The above-described operation of the UE may be implemented by using the devices described in FIGS. 15 to 19, and some of entities may be omitted. For example, referring to FIG. 16, at least one processor 102/202 may control to transmit and receive channel/signal/data/information (e.g., SRS configuration, UL/DL DCI, additional SRS, PDCCH, PDSCH, PUSCH, PUCCH, PHICH, etc) by using at least one transceiver 106/206, and also control to store channel/signal/data/information to be transmitted or received in at least one memory 104/204.

FIG. 12 is a flowchart for describing an operation of a BS to which a method proposed in the present disclosure may be applied. FIG. 12 is just for convenience of the description and does not limit the scope of the present disclosure.

Referring to FIG. 12, a case where in performing the CSI acquisition/reporting operation, the BS receives uplink transmission (e.g., UL channel, additional SRS, etc.) based on the above-described embodiments is assumed.

The BS may report, from the BS, a report for the panel related UE capability (e.g., a UE capability related to the panel based SRS transmission/panel switching) (S1210). As an example, the BS may receive UE capability reporting as in step 0) of the above-described method, and this may be performed through the higher layer signaling. In this case, the UE may also report the information on the UE capability related to CSI acquisition/reporting.

The BS may transmit, to the UE, the SRS configuration related to the CSI acquisition/reporting operation (S1220). As an example, as in step 1) of the above-described method, the BS may transmit, to the UE, an SRS configuration including information related to transmission of the SRS (e.g., SRS-config). In this case, the corresponding SRS configuration may be delivered through the higher layer signaling.

The BS may transmit, to the UE, the SRS related to the CSI acquisition/reporting operation and/or DCI related to transmission such as the UL channel (S1230). However, the corresponding step may also be replaced with the RRC configuration/MAC CE as mentioned in step 2) of the above-described method.

Thereafter, in the CSI acquisition/reporting, the BS may receive, from the UE, the SRS and/or the UL channel(s) transmitted based on the configured/indicated SRS configuration, DCI, and/or a pre-defined (e.g., priority rule, etc.) (S1240). As an example, in multi symbol SRS transmission, in this case, the UE may be configured to transmit the SRS and/or UL channel(s) based on the rule (e.g., specifically, Proposals 2, 3, and 4) described in the above-described method.

The above-described operation of the BS may be implemented by using the devices described in FIGS. 15 to 19, and some of the entities may be omitted. For example, referring to FIG. 16, at least one processor 102/202 may control to transmit and receive channel/signal/data/information (e.g., SRS configuration, UL/DL DCI, additional SRS, PDCCH, PDSCH, PUSCH, PUCCH, PHICH, etc) by using at least one transceiver 106/206, and also control to store channel/signal/data/information to be transmitted or received in at least one memory 104/204.

The SRS transmission method of the UE to which the above-described embodiments are applied will be described in detail with reference to FIG. 13.

FIG. 13 is a flowchart for describing a method of transmitting, by a UE, a sounding reference signal in a wireless communication system according to an embodiment of the present disclosure.

Referring to FIG. 13, a method for transmitting, by a UE, a sounding reference signal in a wireless communication system according to an embodiment of the present disclosure includes a step of transmitting UE capability information related to transmission of an SRS based on a specific usage (S1310), a step of receiving SRS configuration information (S1320), and a step of transmitting the SRS (S1330).

In S1310, the UE transmits UE capability information to the BS. The UE capability information may be related to a sound reference signal (SRS) for downlink channel state information (DL CSI) acquisition.

According to an embodiment, the UE capability information may be related to a plurality of panels. The UE capability information may include information on at least one of the number of plurality of panels, the number of antennas for each panel, whether the SRS resource sets of each panel are simultaneously transmittable, or a panel switching delay.

The number of plurality of panels may include at least one of the number of transmission (Tx) panels or the number of reception (Rx) panels.

The UE capability information may be based on Proposal 1 above.

According to S1310 described above, an operation of the UE (reference numeral 100/200 in FIGS. 15 to 19) which transmits, to the BS (reference numeral 100/200 in FIGS. 15 to 19), the UE capability information may be implemented by the devices of FIGS. 15 to 19. For example, referring to FIG. 16, one or more processors 102 may control one or more transceivers 106 and/or one or more memories 104 so as to transmit, to the BS 200, the UE capability information.

In S1320, the UE receives, from the BS, configuration information related to the transmission of the SRS.

According to an embodiment, at least one SRS resource set may be configured for each panel among the plurality of panels based on the UE capability information. The SRS resource set may include at least one SRS resource. A usage of the SRS resource may be antenna switching.

According to an embodiment, the configuration information may include information on at least one of a plurality of SRS resource sets for the plurality of panels, at least one SRS resource which belongs to each SRS resource set among the plurality of sets, or candidate locations of the SRS resource. The configuration information may be based on Proposal 2 above.

Based on that the UE capability information includes information representing simultaneous transmission of the SRS resource sets of the respective panels, SRS resource sets for different panels may be configured in the same slot, and at least one SRS resource which belongs to the SRS resource sets for the different panels is configured in the same symbol.

According to S1320 described above, an operation of the UE (reference numeral 100/200 in FIGS. 15 to 19) which receives, from the BS (reference numeral 100/200 in FIGS. 15 to 19), the configuration information of related to the transmission of the SRS may be implemented by devices of FIGS. 15 to 19. For example, referring to FIG. 16, one or more processors 102 may control one or more transceivers 106 and/or one or more memories 104 so as to receive, from the BS 200, the configuration information related to the transmission of the SRS.

In S1330, the UE transmits the SRS to the BS. According to an embodiment, the SRS may be transmitted based on at least one of the plurality of panels. When the UE is based on MPUE-assumption 1 or MPUE-assumption 3 described above, the SRS may be transmitted based on any one of the plurality of panels. When the UE is based on MPUE-assumption 2 described above, the SRS may be transmitted based on two or more panels of the plurality of panels.

According to an embodiment, the SRS may be transmitted in at least one symbol based on a specific location among the candidate locations of the SRS resource.

According to an embodiment, the method may further include receiving a message including information representing the specific location before step S1330. In the receiving of the message, the UE may receive, from the BS, the message including information representing the specific location. The message may be based on a Medium Access Control-Control Element (MAC-CE) or Downlink Control Information (DCI).

According to S1330 described above, an operation of the UE (reference numeral 100/200 in FIGS. 15 to 19) which transmits, to the BS (reference numeral 100/200 in FIGS. 15 to 19), the SRS may be implemented by the devices of FIGS. 15 to 19. For example, referring to FIG. 16, one or more processors 102 may control one or more transceivers 106 and/or one or more memories 104 so as to transmit, to the BS 200, the SRS.

The SRS reception method of the BS to which the above-described embodiments are applied will be described in detail with reference to FIG. 13.

FIG. 14 is a flowchart for describing a method for receiving, by a BS, a sounding reference signal in a wireless communication system according to another embodiment of the present disclosure.

Referring to FIG. 14, a method for receiving, by a UE, a sounding reference signal in a wireless communication system according to another embodiment of the present disclosure includes a step of receiving UE capability information (S1410), a step of transmitting SRS configuration information (S1420), and a step of transmitting the SRS (S1430).

In S1410, the BS receives the UE capability information from the BS. The UE capability information may be related to a sound reference signal (SRS) for downlink channel state information (DL CSI) acquisition.

According to an embodiment, the UE capability information may be related to a plurality of panels. The UE capability information may include information on at least one of the number of plurality of panels, the number of antennas for each panel, whether the SRS resource sets of each panel are simultaneously transmittable, or a panel switching delay.

The number of plurality of panels may include at least one of the number of transmission (Tx) panels or the number of reception (Rx) panels.

The UE capability information may be based on Proposal 1 above.

According to S1410 described above, an operation of the BS (reference numeral 100/200 in FIGS. 15 to 19) which receives, from the UE (reference numeral 100/200 in FIGS. 15 to 19), the UE capability information may be implemented by the devices of FIGS. 15 to 19. For example, referring to FIG. 16, one or more processors 202 may control one or more transceivers 206 and/or one or more memories 204 so as to receive, from the UE 100, the UE capability information.

In S1420, the BS transmits, to the UE, configuration information related to the transmission of the SRS.

According to an embodiment, at least one SRS resource set may be configured for each panel among the plurality of panels based on the UE capability information. The SRS resource set may include at least one SRS resource. A usage of the SRS resource may be antenna switching.

According to an embodiment, the configuration information may include information on at least one of a plurality of SRS resource sets for the plurality of panels, at least one SRS resource which belongs to each SRS resource set among the plurality of sets, or candidate locations of the SRS resource. The configuration information may be based on Proposal 2 above.

Based on that the UE capability information includes information representing simultaneous transmission of the SRS resource sets of the respective panels, SRS resource sets for different panels may be configured in the same slot, and at least one SRS resource which belongs to the SRS resource sets for the different panels is configured in the same symbol.

According to S1420 described above, an operation of the BS (reference numeral 100/200 in FIGS. 15 to 19) which transmits, to the UE (reference numeral 100/200 in FIGS. 15 to 19), the configuration information of related to the transmission of the SRS may be implemented by the devices of FIGS. 15 to 19. For example, referring to FIG. 16, one or more processors 202 may control one or more transceivers 206 and/or one or more memories 204 so as to transmit, to the UE 100, the configuration information related to the transmission of the SRS.

In S1430, the BS receives the SRS from the UE. According to an embodiment, the SRS may be transmitted based on at least one of the plurality of panels. When the UE is based on MPUE-assumption 1 or MPUE-assumption 3 described above, the SRS may be transmitted based on any one of the plurality of panels. When the UE is based on MPUE-assumption 2 described above, the SRS may be transmitted based on two or more panels of the plurality of panels.

According to an embodiment, the SRS may be transmitted in at least one symbol based on a specific location among the candidate locations of the SRS resource.

According to an embodiment, the method may further include transmitting a message including information representing the specific location before step S1430. In the transmitting of the message, the BS may transmit, to the UE, the message including information representing the specific location. The message may be based on a Medium Access Control-Control Element (MAC-CE) or Downlink Control Information (DCI).

According to S1430 described above, an operation of the BS (reference numeral 100/200 in FIGS. 15 to 19) which receives, from the UE (reference numeral 100/200 in FIGS. 15 to 19), the SRS may be implemented by the devices of FIGS. 15 to 19. For example, referring to FIG. 16, one or more processors 202 may control one or more transceivers 206 and/or one or more memories 204 so as to receive, from the UE 100, the SRS.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 15 illustrates a communication system 1 applied to the present disclosure.

Referring to FIG. 15, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 16 illustrates wireless devices applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 17 illustrates a signal process circuit for a transmission signal.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 18 illustrates another example of a wireless device applied to the present disclosure.

The wireless device may be implemented in various forms according to a use-case/service (refer to FIG. 15). Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 19 illustrates a hand-held device applied to the present disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method for transmitting and receiving the SRS in the wireless communication system and the device therefor according to the embodiment of the present disclosure are described below.

According to an embodiment of the present disclosure, an SRS for an antenna switching usage, which is transmitted by a multi-panel UE is transmitted based on an SRS resource set configured for each panel. Accordingly, downlink channel state information can be obtained for each panel.

According to an embodiment of the present disclosure, a UE capable of simultaneous transmission through multi-panels transmits the SRS in at least one symbol according to a specific location among a plurality of candidate locations. Accordingly, when SRS resources based on different panels are configured in the same symbol, SRS transmission can be performed so that inter-beam interference of each SRS is minimized.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method for transmitting, by a user equipment (UE), a sounding reference signal (SRS) in a wireless communication system, the method comprising:
   transmitting UE capability information associated with a sound reference signal (SRS) for downlink channel state information (DL CSI) acquisition;
   receiving configuration information related to transmission of the SRS; and
   transmitting the SRS,
   wherein the UE capability information is related to a plurality of panels,
   wherein at least one of SRS resource sets is configured for each panel among the plurality of panels based on the UE capability information, and
   wherein the SRS is transmitted based on at least one of the plurality of panels,
   wherein based on the UE capability information including information representing simultaneous transmission of the SRS resource sets of the respective panels, the SRS resource sets for different panels are configured in the same slot, and at least one SRS resource which belongs to the SRS resource sets for the different panels is configured in the same symbol.

2. The method of claim 1, wherein the UE capability information further includes information on at least one of the number of plurality of panels, the number of antennas for each panel, or a panel switching delay.

3. The method of claim 2, wherein the number of plurality of panels includes at least one of the number of transmission (Tx) panels or the number of reception (Rx) panels.

4. The method of claim 2, wherein the configuration information includes information on the at least one of the SRS resource sets for the plurality of panels, the at least one SRS resource which belongs to each SRS resource set among the SRS resource sets, or candidate locations of the at least one SRS resource.

5. The method of claim 1, wherein the SRS is transmitted in at least one symbol based on a specific location among the candidate locations of the SRS resource.

6. The method of claim 5, further comprising:
   receiving a message including information representing the specific location.

7. The method of claim 6, wherein the message is based on a Medium Access Control-Control Element (MAC-CE) or Downlink Control Information (DCI).

8. A UE for transmitting a sounding reference signal (SRS) in a wireless communication system, the UE comprising:
   one or more transceivers;
   one or more processors; and
   one or more memories operably connectable to the one or more processors, and storing instructions of performing operations when the transmission of the SRS is executed by the one or more processors,
   wherein the operations include
   transmitting UE capability information associated with a sound reference signal (SRS) for downlink channel state information (DL CSI) acquisition,
   receiving configuration information related to transmission of the SRS, and transmitting the SRS, and transmitting the SRS, wherein the UE capability information is related to the plurality of panels, wherein at least one of the SRS resource sets is configured for each panel among the plurality of panels based on the UE capability information, and wherein the SRS is transmitted based on at least one of the plurality of panels, wherein based on the UE capability information including information representing simultaneous transmission of the SRS resource sets of the respective panels, the SRS resource sets for different panels are configured in the same slot, and at least one SRS resource which belongs to the SRS resource sets for the different panels is configured in the same symbol.

9. A method for receiving, by a base station (BS), a sounding reference signal (SRS) in a wireless communication system, the method comprising:

receiving UE capability information associated with a sound reference signal (SRS) for downlink channel state information (DL CSI) acquisition;

transmitting configuration information related to transmission of the SRS; and receiving the SRS, wherein the UE capability information is related to the plurality of panels, wherein at least one of the SRS resource sets is configured for each panel among the plurality of panels based on the UE capability information, and wherein the SRS is received based on at least one of the plurality of panels, wherein based on the UE capability information including information representing simultaneous transmission of the SRS resource sets of the respective panels, the SRS resource sets for different panels are configured in the same slot, and at least one SRS resource which belongs to the SRS resource sets for the different panels is configured in the same symbol.

* * * * *